(12) United States Patent
Hatakeyama et al.

(10) Patent No.: US 7,990,623 B2
(45) Date of Patent: Aug. 2, 2011

(54) ZOOM LENS AND IMAGING CAPTURING DEVICE

(75) Inventors: Takeshi Hatakeyama, Chiba (JP); Daisuke Kuroda, Kanagawa (JP); Motoyuki Otake, Saitama (JP); Yoshito Iwasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 11/597,521

(22) PCT Filed: Feb. 24, 2006

(86) PCT No.: PCT/JP2006/303419
§ 371 (c)(1),
(2), (4) Date: Sep. 11, 2009

(87) PCT Pub. No.: WO2006/103855
PCT Pub. Date: Oct. 5, 2006

(65) Prior Publication Data
US 2009/0324207 A1 Dec. 31, 2009

(30) Foreign Application Priority Data
Mar. 29, 2005 (JP) .................. 2005-095724

(51) Int. Cl.
G02B 15/14 (2006.01)
G02B 27/64 (2006.01)

(52) U.S. Cl. ........................ 359/683; 359/557

(58) Field of Classification Search .................. 359/554, 359/557, 676, 683
See application file for complete search history.

(56) References Cited

U.S. PATENT DOCUMENTS

| | | | | |
|---|---|---|---|---|
| 5,831,775 A | * | 11/1998 | Matsui | 359/745 |
| 6,989,942 B1 | * | 1/2006 | Nurishi | 359/687 |
| 7,369,313 B2 | * | 5/2008 | Otake | 359/557 |

FOREIGN PATENT DOCUMENTS

JP 1-189621 7/1989
(Continued)

OTHER PUBLICATIONS

Japanese Office Action dated Mar. 4, 2008 for corresponding Japanese Application No. 2005-095724.
(Continued)

*Primary Examiner* — Scott J Sugarman
(74) *Attorney, Agent, or Firm* — Rader, Fishman & Grauer PLLC

(57) ABSTRACT

An object is to reduce the effect of defocusing due to the movement of an image plane when a shifting lens group movable in a direction perpendicular to the optical axis for correcting hand jiggling is positionally deviated along the optical axis, thereby maintaining high optical performance at the time of correcting hand jiggling. A zoom lens 1 includes a plurality of lens groups with distances between the lens groups being changed for variable power. A final lens group L5 which is positioned most closely to an image side has a sub lens group GS (G8) having a positive refractive power and a sub lens group GR (G9) disposed adjacent to the sub lens group GS (G8) on the image side and having a positive refractive power. The sub lens group GS is shiftable in a direction perpendicular to the optical axis for correcting image blurs. The sub lens group GS has a lateral magnification βs and the sub lens group GR has a lateral magnification βR, the lateral magnifications satisfying the following conditional expressions (1), (2):

$$\beta s < 1 \quad (1)$$

$$0 < \beta R < 1 \quad (2)$$

9 Claims, 26 Drawing Sheets

| | FOREIGN PATENT DOCUMENTS | |
|---|---|---|
| JP | 1-191113 | 8/1989 |
| JP | 07-092431 | 4/1995 |
| JP | 9-230236 | 9/1997 |
| JP | 11-109431 | 4/1999 |
| JP | 11-282038 | 10/1999 |
| JP | 13-124992 | 5/2001 |
| JP | 13-356270 | 12/2001 |
| JP | 2003-029146 | 1/2003 |
| JP | 2004-333721 | 11/2004 |
| JP | 2004-361642 | 12/2004 |

OTHER PUBLICATIONS

Extended European Search Report dated Jun. 11, 2008 for corresponding European Application No. 06 71 4558.

International Preliminary Search Report on Patentability dated: Nov. 1, 2007.

* cited by examiner

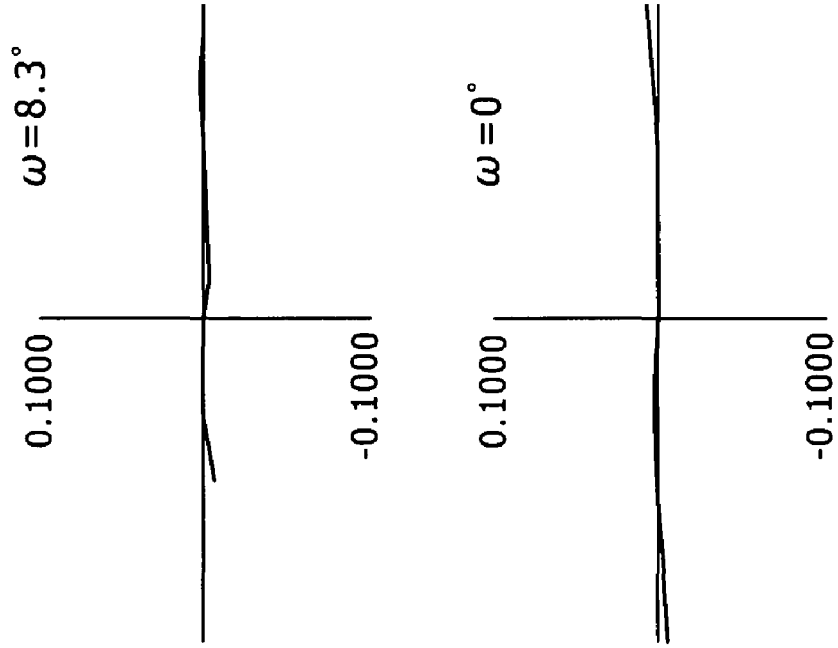
FIG. 5
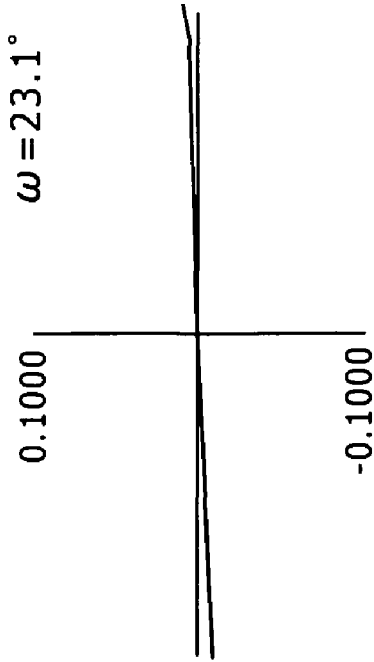
FIG. 4
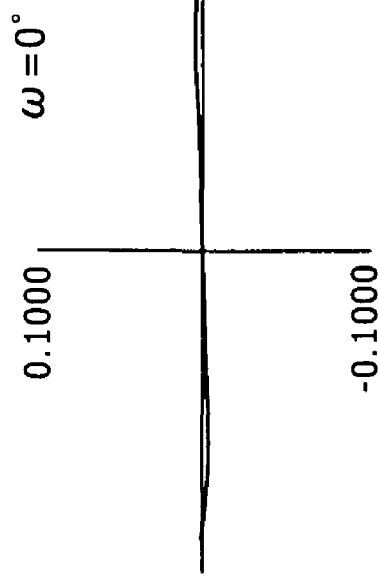

FIG.6
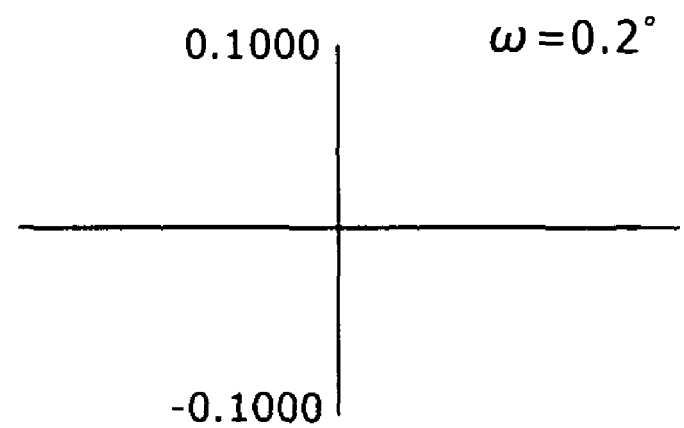
ω=0.2°
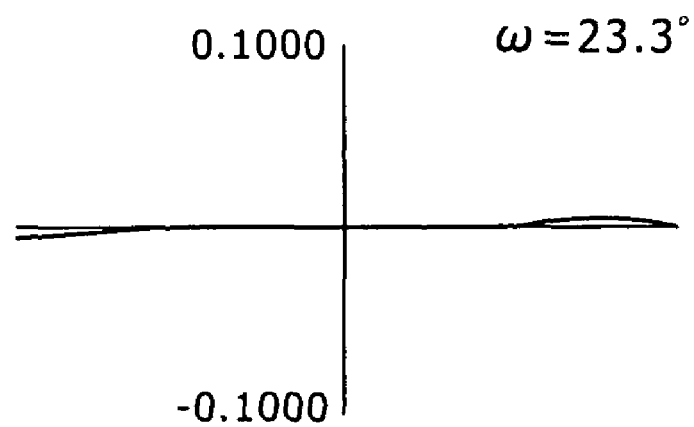
ω=23.3°
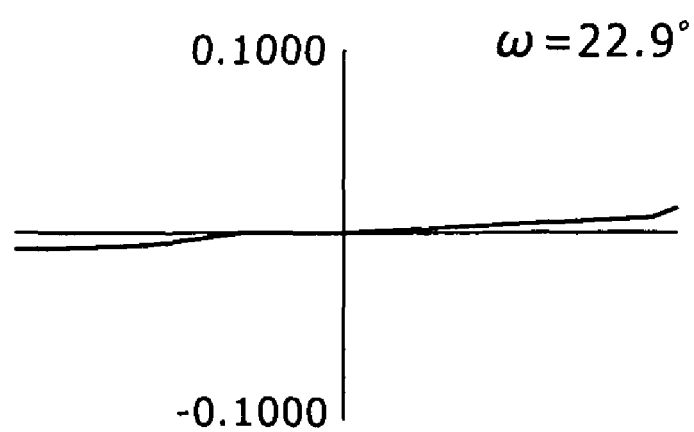
ω=22.9°

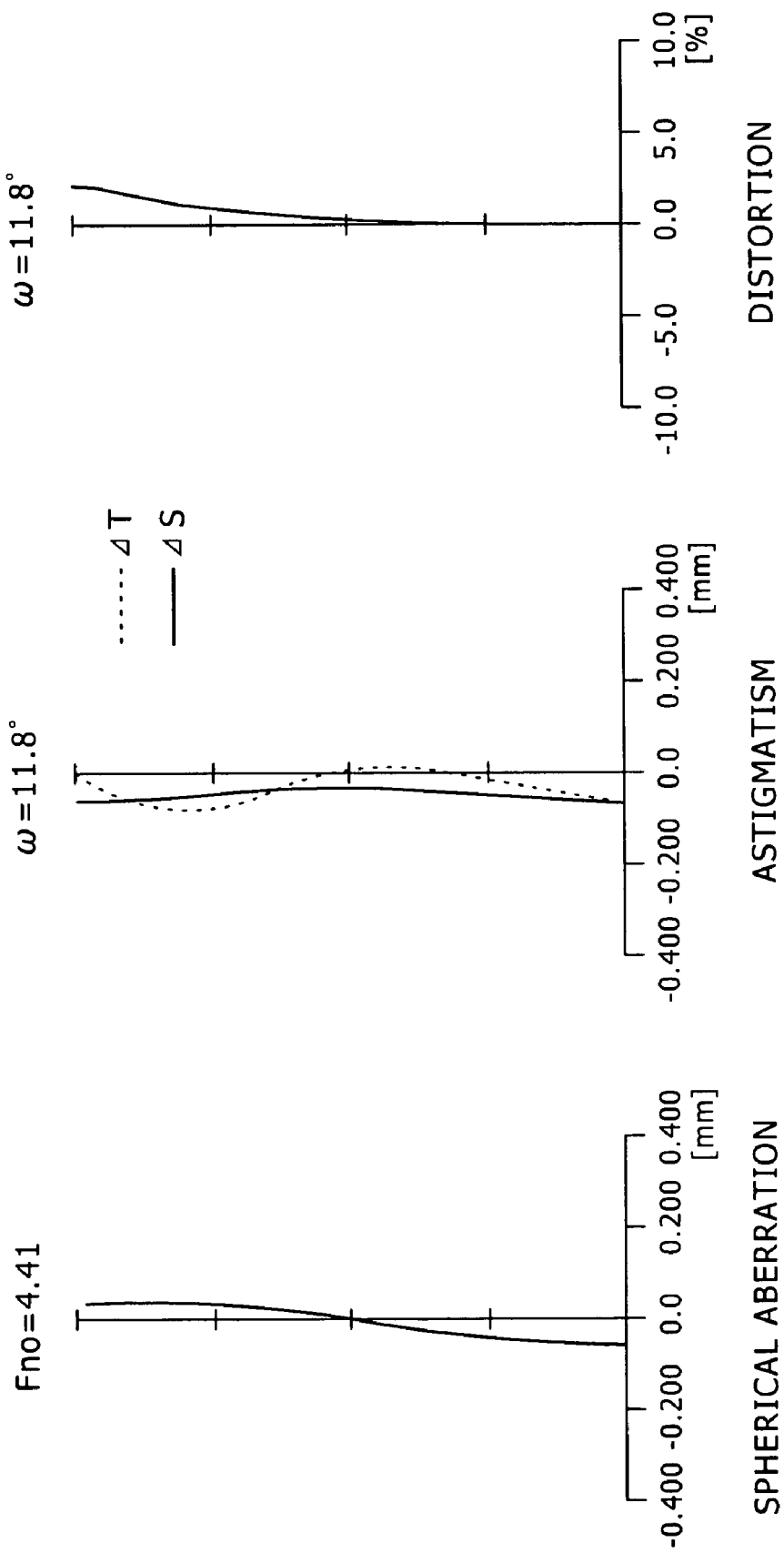

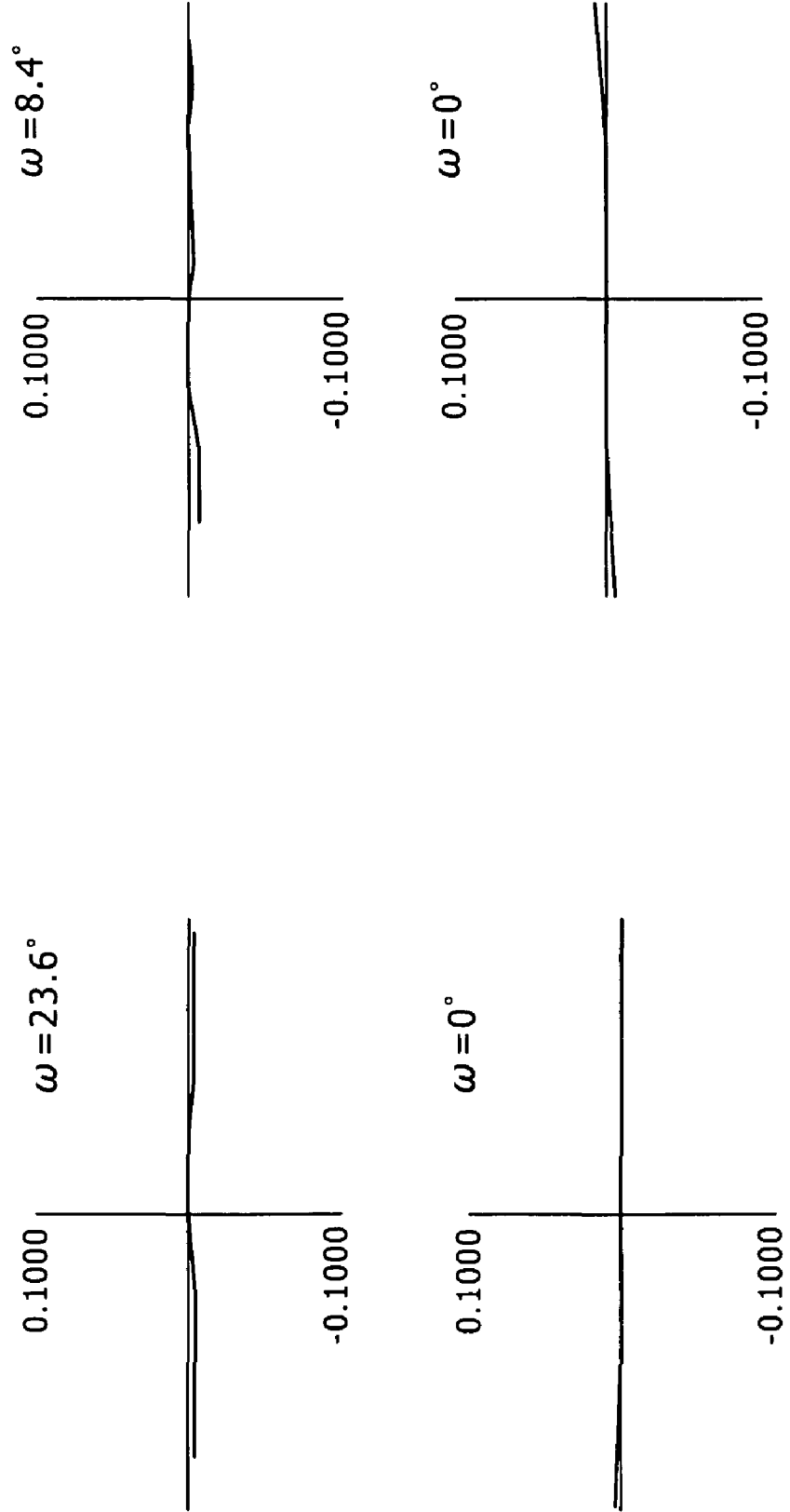

FIG.13
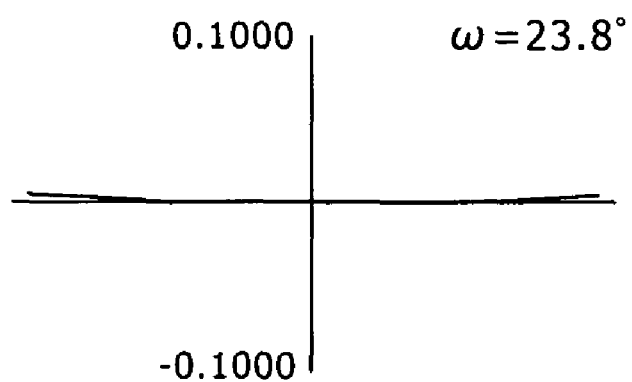
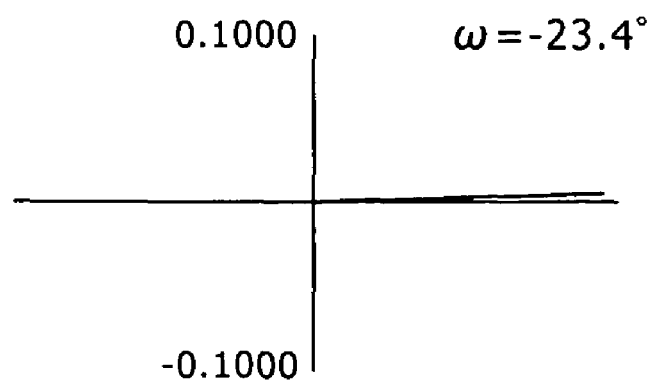

FIG. 14
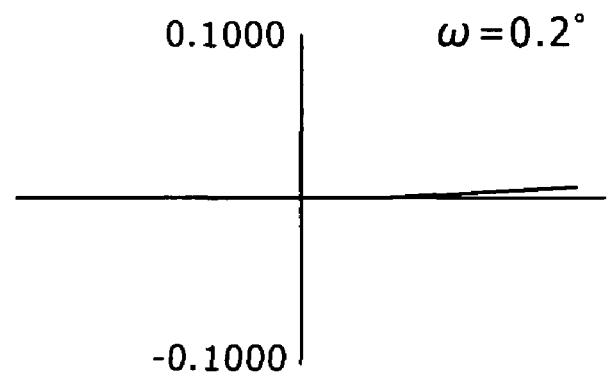
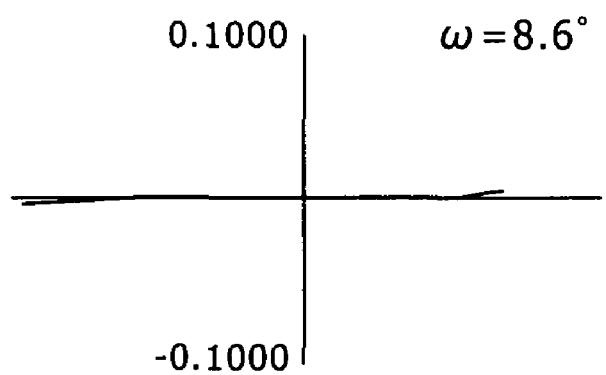
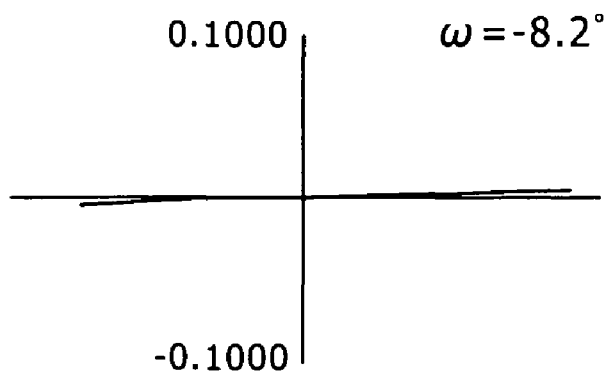

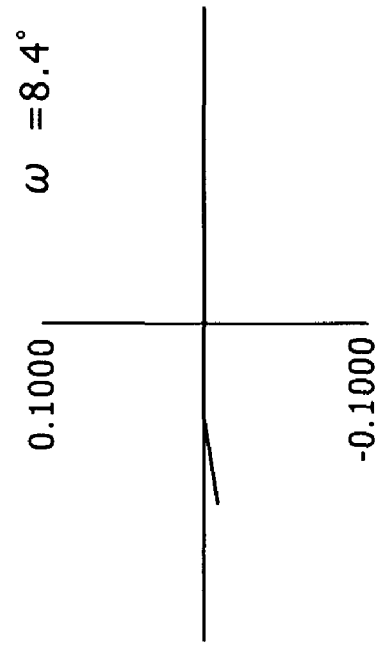
FIG.18
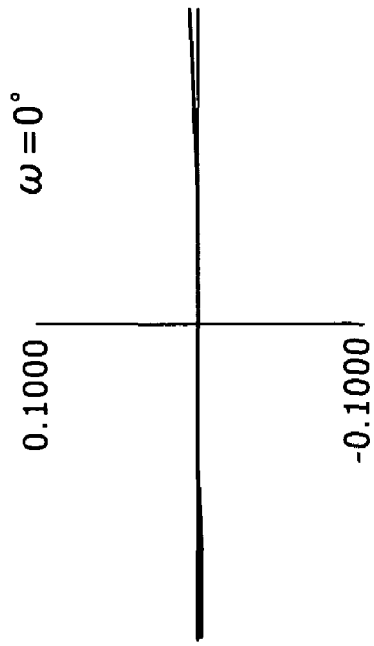
FIG.19
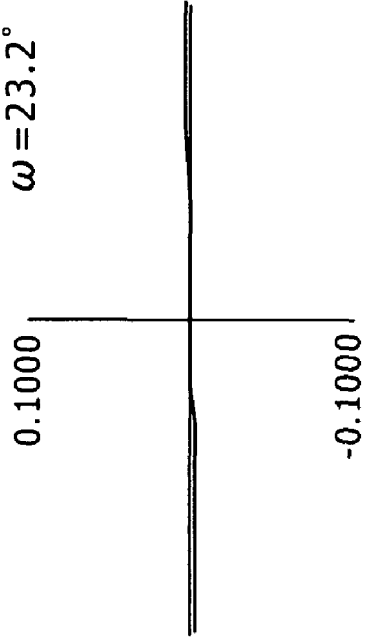
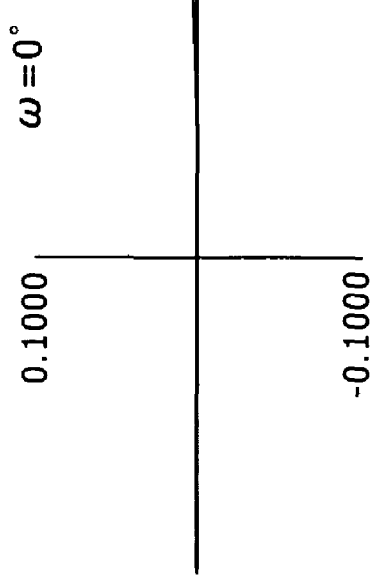

FIG.20
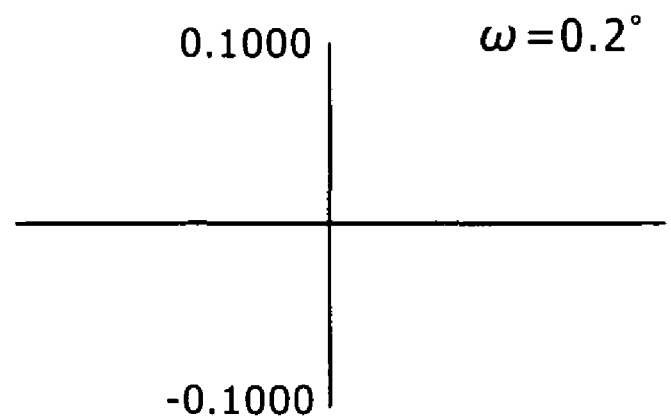
$\omega = 0.2°$
$\omega = 23.4°$
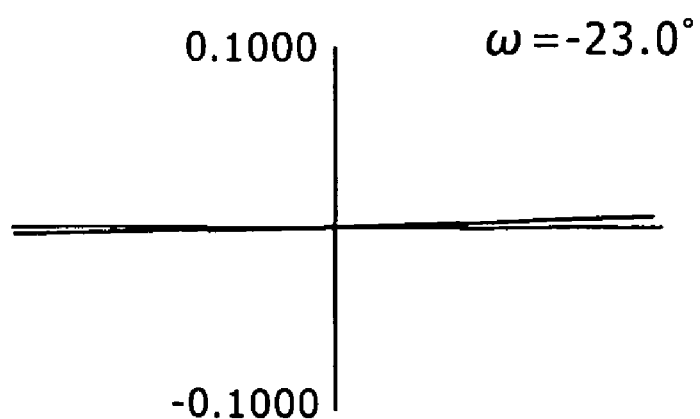
$\omega = -23.0°$

FIG. 21
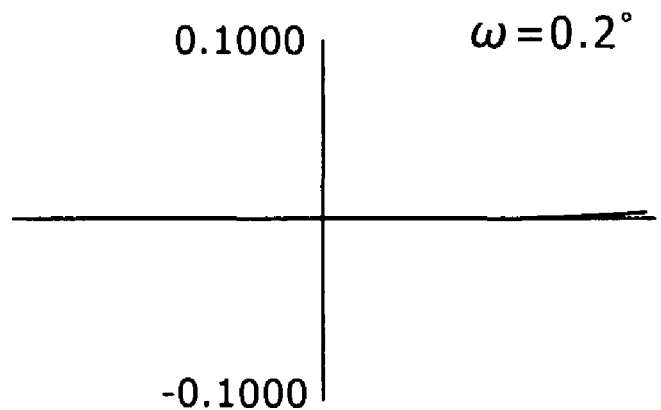
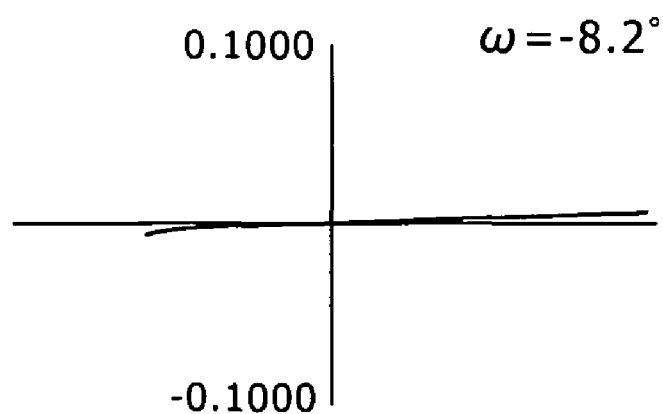

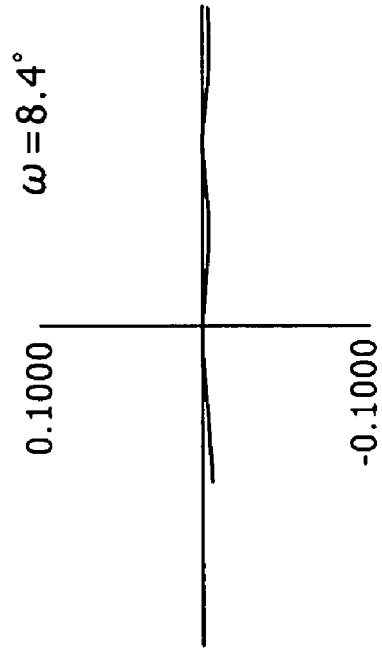
FIG.26
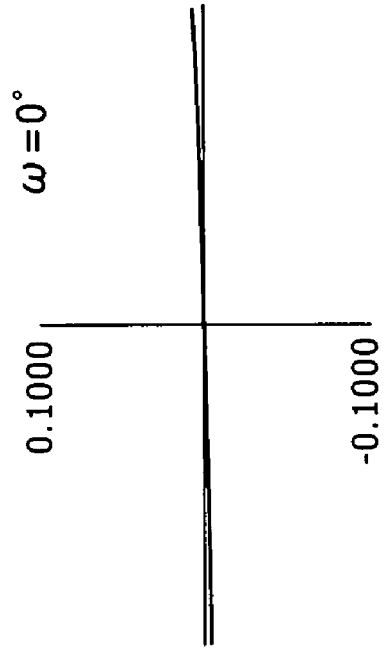
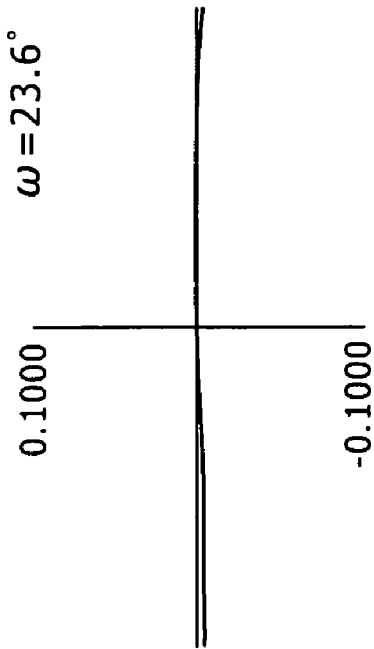
FIG.25
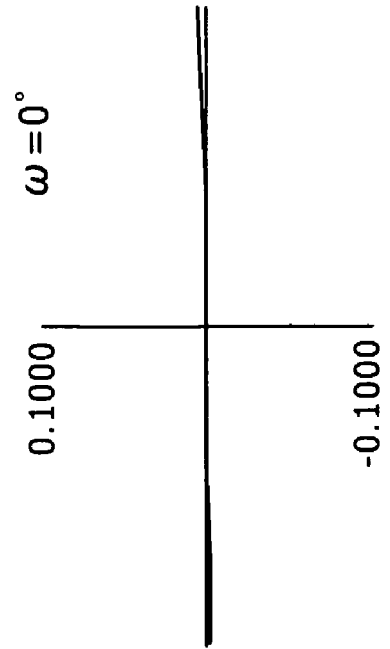

FIG.27
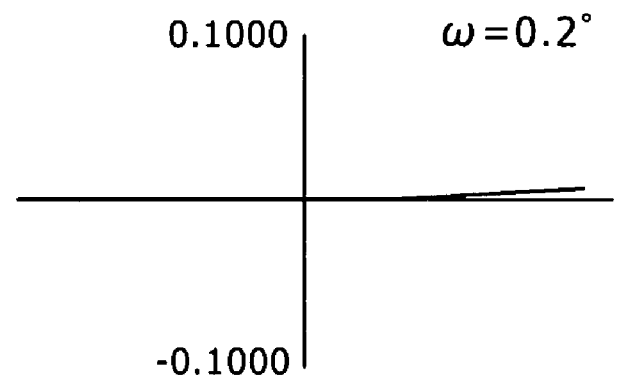
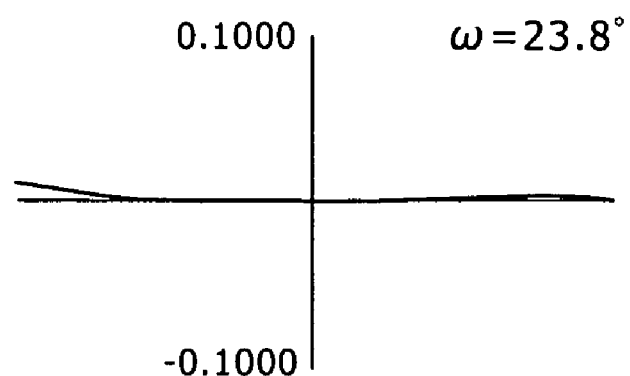
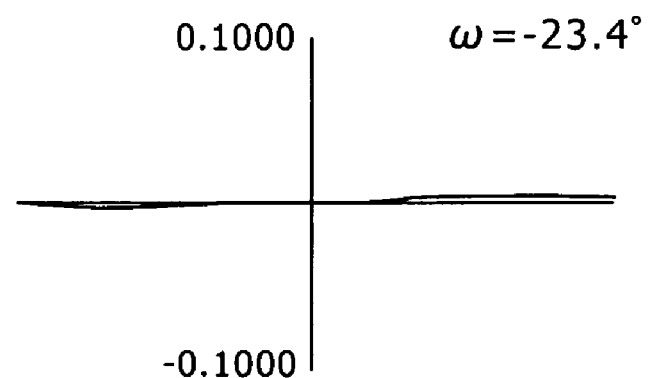

FIG.28
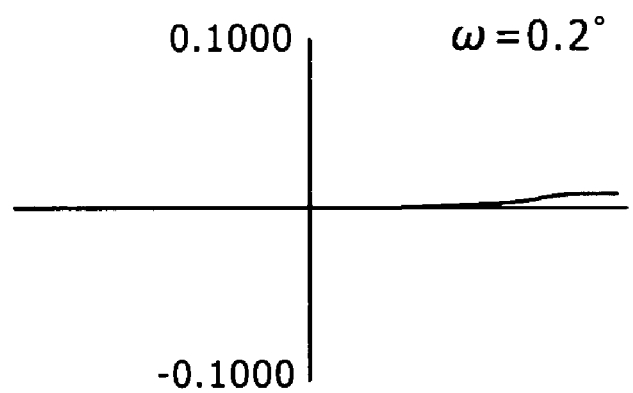
ω=0.2°
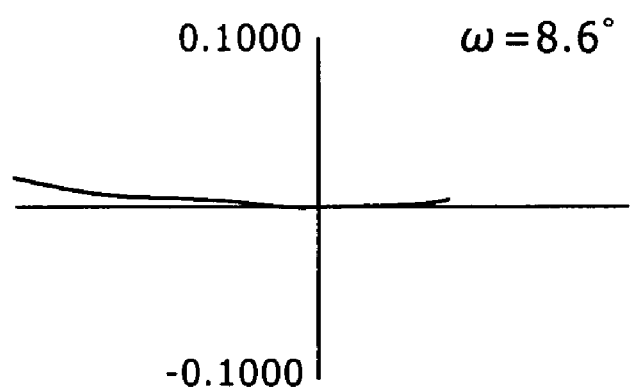
ω=8.6°
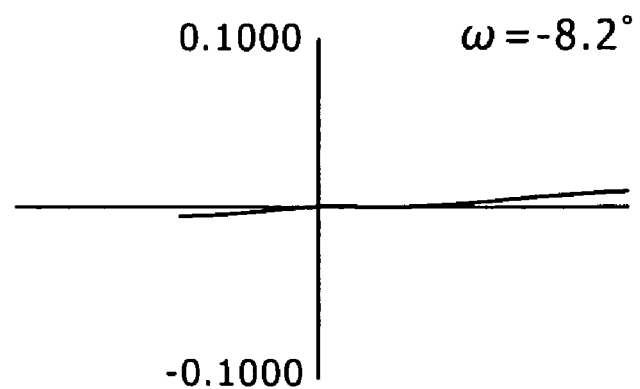
ω=-8.2°

FIG. 30
FIG.30(a)
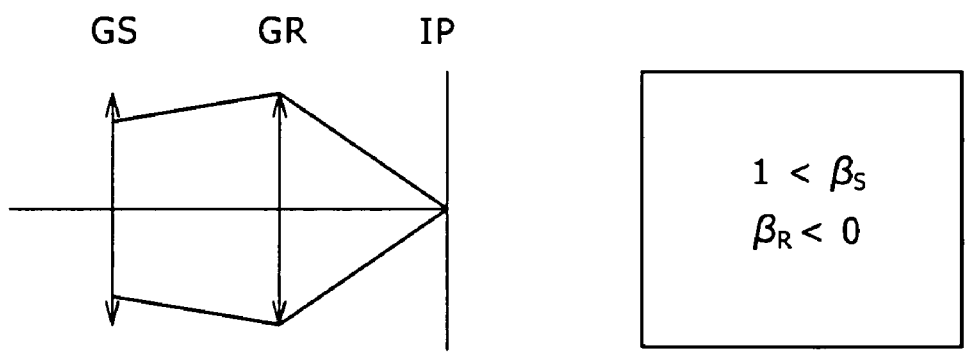
FIG.30(b)
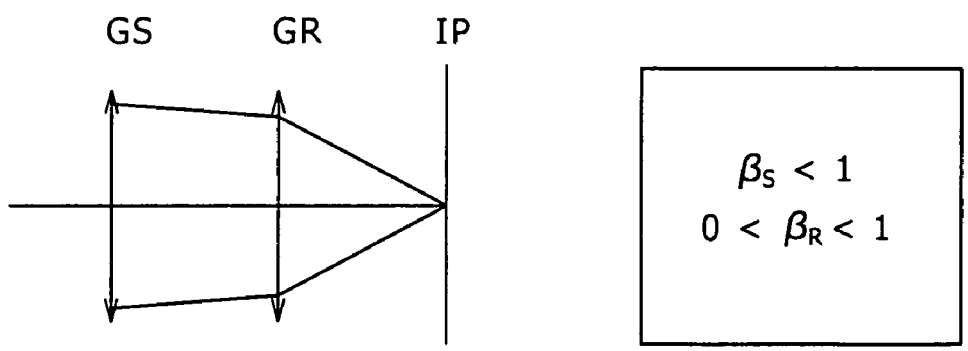

ZOOM LENS AND IMAGING CAPTURING DEVICE

TECHNICAL FIELD

The present invention relates to a novel zoom lens and image capturing device. More particularly, the invention relates to a zoom lens which is capable of optically correcting image blurs due to hand jiggling when capturing images and which can well be reduced in size, and an image capturing device having such a zoom lens.

BACKGROUND ART

There have heretofore been proposed various zoom lenses having a function to correct image blurs due to hand jiggling when capturing images with cameras.

For example, zoom lenses disclosed in Patent Document 1 and Patent Document 2 have a first lens group having a positive refractive power, a second lens group having a negative refractive power, a third lens group having a positive refractive power, a fourth lens group having a negative refractive power, and a fifth lens group having a positive refractive power, which lens groups are arranged successively from the object side. At least the second lens group and the fourth lens group are moved along the optical axis for variable power, and the third lens group that is positioned near the aperture diaphragm is moved in its entirety in a direction perpendicular to the optical axis for correcting image blurs at the time the zoom lens is vibrated.

A zoom lens disclosed in Patent Document 3 has a plurality of lens groups. Those lens groups which are movable along the optical axis for variable power or focusing are shifted in a direction perpendicular to the optical axis for correcting image blurs at the time the zoom lens is vibrated.

A zoom lens disclosed in Patent Document 4 has a plurality of lens groups. The first lens group that is positioned most closely to the object side is shifted in a direction perpendicular to the optical axis for correcting image blurs at the time the zoom lens is vibrated.

A zoom lens disclosed in Patent Document 5 has a plurality of lens groups. The final lens group that is positioned most closely to the image side is shifted in a direction perpendicular to the optical axis for correcting image blurs at the time the zoom lens is vibrated.

Optical systems of recent years which have greatly been reduced in size have a highly reduced number of lenses and are made up of small-diameter lens groups. Therefore, manufacturing tolerances and assembling positional accuracies required for the individual lenses are highly stringent, so that skilled manufacturing techniques are needed to achieve sufficient optical performance. For shifting lens groups of such small-size optical systems in a direction perpendicular to the optical axis for correcting image blurs, the lens groups are required to be shifted quickly and accurately in the direction perpendicular to the optical axis. To handle positional deviations along the optical axis, some schemes need to be incorporated to reduce focusing sensitivity.

A review of the conventional zoom lenses indicates that efforts are made in many zoom lenses to reduce an off-center aberration which occurs when a lens group is shifted in a direction perpendicular to the optical axis. For example, a zoom lens disclosed in Patent Document 6 has a hand-jiggling correcting group which is shifted in a direction perpendicular to the optical axis for correcting hand jiggling, and a lens group which is positioned more closely to the image side than the hand-jiggling correcting group and which is fixed upon hand jiggling. Of the lenses of the hand-jiggling correcting group, a lens which is positioned most closely to the image side is referred to as a lens GS, and a lens which is positioned adjacent to the lens GS on the image side and which is fixed for correcting image blurs is referred to as a lens GR. Conditional equations are given about shape factors and refractive powers of the lens GS and the lens GR. These conditional equations are designed to reduce an off-center aberration. Measures that could have been taken from the stage of designing zoom lenses capable of correcting image blurs have not been taken about how to reduce the effect of an off-center component which does not contribute to the correction of image blurs in directions other than the direction perpendicular to the optical axis.

In the zoom lenses disclosed in Patent Document 1 and Patent Document 2, the lens group which is positioned near the aperture diaphragm and which is fixed for varying power is used to correct image blurs. Since an aperture diaphragm mechanism and a vibration insulation actuating mechanism would tend to interfere with each other, the optical system cannot sufficiently be reduced in size.

The zoom lens disclosed in Patent Document 3 has a complex actuating mechanism because vibrations are isolated by the lens groups which are movable along the optical axis for variable power or focusing.

In the zoom lens disclosed in Patent Document 4, the first lens group positioned most closely to the object side serves to isolate vibrations. However, since the first lens group is spaced apart from the image plane and off-axis rays pass through the first lens group off the optical axis, the lens diameter of the first lens group is large, and the vibration insulation actuating mechanism is large in size, which is not preferable.

The zoom lens disclosed in Patent Document 5 has a plurality of lens groups. The final lens group that is positioned most closely to the image side is shifted in its entirety in a direction perpendicular to the optical axis for correcting image blurs at the time the zoom lens is vibrated. However, when the final lens group is shifted in its entirety in the direction perpendicular to the optical axis, it is inevitably positionally deviated along the optical axis to move the image plane, tending to cause defocusing.

[Patent Document 1] Japanese Patent Laid-Open No. Hei 13-124992
[Patent Document 2] Japanese Patent Laid-Open No. Hei 13-356270
[Patent Document 3] Japanese Patent Laid-Open No. Hei 11-282038
[Patent Document 4] Japanese Patent Laid-Open No. Hei 1-189621
[Patent Document 5] Japanese Patent Laid-Open No. Hei 1-191113
[Patent Document 6] Japanese Patent Laid-Open No. Hei 9-230236.

DISCLOSURE OF THE INVENTION

In view of the aforesaid problems, it is an object of the present invention to reduce the effect of defocusing due to the movement of an image plane when a shifting lens group movable in a direction perpendicular to the optical axis for correcting hand jiggling is positionally deviated along the optical axis, thereby maintaining high optical performance at the time of correcting hand jiggling.

To accomplish the above object, a zoom lens according to the present invention has a final lens group which is positioned most closely to an image side, the final lens group having a sub lens group GS having a positive refractive power and a sub lens group GR disposed adjacent to the sub lens group GS on the image side and having a positive refractive power, the sub lens group GS being shiftable in a direction perpendicular to the optical axis for correcting image blurs, the sub lens group GS having a lateral magnification βs and the sub lens group GR having a lateral magnification βR, the lateral magnifications satisfying the following conditional expressions (1), (2):

$$\beta_s < 1 \quad (1)$$

$$0 < \beta_R < 1. \quad (2)$$

To accomplish the above object, an image capturing device according to the present invention includes a zoom lens and an imaging element for converting an optical image formed by the zoom lens into an electric signal, wherein the zoom lens includes a plurality of lens groups with distances between the lens groups being changed for variable power, a final lens group which is positioned most closely to an image side has a sub lens group GS having a positive refractive power and a sub lens group GR disposed adjacent to the sub lens group GS on the image side and having a positive refractive power, the sub lens group GS is shiftable in a direction perpendicular to the optical axis for correcting image blurs, and the sub lens group GS has a lateral magnification βs and the sub lens group GR has a lateral magnification βR, the lateral magnifications satisfying the following conditional expressions (1), (2):

$$\beta s < 1 \quad (1)$$

$$0 < \beta R < 1. \quad (2)$$

The zoom lens according to the present invention suppresses the movement of an image plane when image blurs are corrected. The image capturing device according to the present invention, which incorporates the zoom lens according to the present invention, has a hand jiggling correcting function, can be constructed in a small size, and can suppress the movement of an image plane when image blurs are corrected, thereby obtaining high-quality images.

The zoom lens according to the present invention includes a plurality of lens groups with distances between the lens groups being changed for variable power, wherein a final lens group which is positioned most closely to an image side has a sub lens group GS having a positive refractive power and a sub lens group GR disposed adjacent to the sub lens group GS on the image side and having a positive refractive power, the sub lens group GS is shiftable in a direction perpendicular to the optical axis for correcting image blurs, and the sub lens group GS has a lateral magnification βs and the sub lens group GR has a lateral magnification βR, the lateral magnifications satisfying the following conditional expressions (1), (2):

$$\beta s < 1 \quad (1)$$

$$0 < \beta R < 1. \quad (2)$$

The image capturing device according to the present invention includes a zoom lens and an imaging element for converting an optical image formed by the zoom lens into an electric signal, wherein the zoom lens includes a plurality of lens groups with distances between the lens groups being changed for variable power, a final lens group which is positioned most closely to an image side has a sub lens group GS having a positive refractive power and a sub lens group GR disposed adjacent to the sub lens group GS on the image side and having a positive refractive power, the sub lens group GS is shiftable in a direction perpendicular to the optical axis for correcting image blurs, and the sub lens group GS has a lateral magnification βs and the sub lens group GR has a lateral magnification βR, the lateral magnifications satisfying the following conditional expressions (1), (2):

$$\beta s < 1 \quad (1)$$

$$0 < \beta R < 1. \quad (2)$$

Therefore, the zoom lens according to the present invention is capable of correcting image blurs by shifting the sub lens group GS in direction perpendicular to the optical axis. The effect that a displacement which the sub lens group GS makes when an image blur is corrected has on movement of the image plane is small, allowing a well focused image to be produced when the image blur is corrected. Since the final lens group includes a correcting lens group, a lens barrel structure including an actuating mechanism for the blur correcting lens group can be constructed simply in a small size.

The image capturing device according to the present invention incorporates the above zoom lens according to the present invention, and hence has a hand jiggling correcting function and is small in size. The image capturing device is capable of producing a high-quality image by suppressing movement of the image plane when hand jiggling is corrected.

According to another feature of the invention described, since the final lens group has a sub lens group GF disposed adjacent to the sub lens group GS on an object side and having a negative refractive power. Therefore, the zoom lens can further be reduced in size.

According to still another feature of the invention described; since the lateral magnifications satisfy the following conditional expressions (3), (4):

$$-0.5 < \beta s < 0.5 \quad (3)$$

$$0.5 < \beta R < 1, \quad (4)$$

the image quality can further be increased.

According to another aspect of the invention described in claim 4, since the lens surface of the sub lens group GS which is closest to the object side has a radius RS1 of curvature and the lens surface thereof which is closest to the image side has a radius RS2 of curvature, the radii of curvature satisfying the following conditional expression (5):

$$-3.0 < (RS1+RS2)/(RS1-RS2) < 1.5, \quad (5)$$

various aberrations can be corrected better, the off-center aberration caused when image blurs are corrected is suppressed, and movement of the image plane can further be suppressed.

According to still another aspect of the invention described, since the first lens group which is positioned most closely to the image side has a reflecting member for bending the optical axial through about 90 degrees, the zoom lens can be reduced in size in the direction of the optical axis of incident light, and it is easy to provide a space for placing therein an actuating mechanism for the blur correcting lens group.

According to yet another feature of the invention described, a lens group which is positioned more closely to the image side than an aperture diaphragm is moved along the optical to make a focusing action. Therefore, a change in the angle of field can be reduced when a focusing action is made.

According to the invention described, the lens groups include a first lens group having a positive refractive power, a second lens group having a negative refractive power and movable along the optical axis for variable power, a third lens group having a positive refractive power, a fourth lens group having a positive refractive power and movable along the optical axis for keeping an image plane, which would tend to vary upon movement of the second lens group and movement of the position of a subject, in a constant position, and a fifth lens group having a positive or negative refractive power as the final lens group, which lens groups are arranged successively from the object side. Consequently, it is possible to produce a high-quality image where various aberrations are well corrected.

According to a final feature of the invention described, the image capturing device includes a hand jiggling detecting means for detecting a jiggle of the imaging element, a hand jiggling control means for calculating a jiggle correcting angle to compensate for an image blur caused by the jiggle of the imaging element as detected by the hand jiggling detecting means, and sending a drive signal to an actuator for bringing the sub lens group GS into a position based on the jiggle correcting angle, and a hand jiggling actuator for shifting the sub lens group in a direction perpendicular to the optical axis based on the drive signal. Therefore, image blurs due to a displacement of the imaging element based on hand jiggling can be corrected, and a well-focused high-quality image where various aberrations are well corrected can be acquired.

BRIEF DESCRIPTION OF THE DRAWINGS

FIG. 4 is a diagram showing lateral aberrations at the wide-angle end.

FIG. 5 is a diagram showing lateral aberrations at the telephoto end.

FIG. 6 is a diagram showing lateral aberrations when an image blur of 0.2 degree is corrected at the wide-angle end.

FIG. 10 is a diagram showing spherical aberration, astigmatism, and distortion at a telephoto end.

FIG. 11 is a diagram showing lateral aberrations at the wide-angle end.

FIG. 12 is a diagram showing lateral aberrations at the telephoto end.

FIG. 13 is a diagram showing lateral aberrations when an image blur of 0.2 degree is corrected at the wide-angle end.

FIG. 14 is a diagram showing lateral aberrations when an image blur of 0.2 degree is corrected at the telephoto end.

FIG. 18 is a diagram showing lateral aberrations at the wide-angle end.

FIG. 19 is a diagram showing lateral aberrations at the telephoto end.

FIG. 20 is a diagram showing lateral aberrations when an image blur of 0.2 degree is corrected at the wide-angle end.

FIG. 21 is a diagram showing lateral aberrations when an image blur of 0.2 degree is corrected at the telephoto end.

FIG. 25 is a diagram showing lateral aberrations at the wide-angle end.

FIG. 26 is a diagram showing lateral aberrations at the telephoto end.

FIG. 27 is a diagram showing lateral aberrations when an image blur of 0.2 degree is corrected at the wide-angle end.

FIG. 28 is a diagram showing lateral aberrations when an image blur of 0.2 degree is corrected at the telephoto end.

FIG. 30 is a diagram illustrative of the magnitude of focusing sensitivity provided when a shifting lens group is disposed as a final lens group.

BEST MODE FOR CARRYING OUT THE INVENTION

Figure 1:
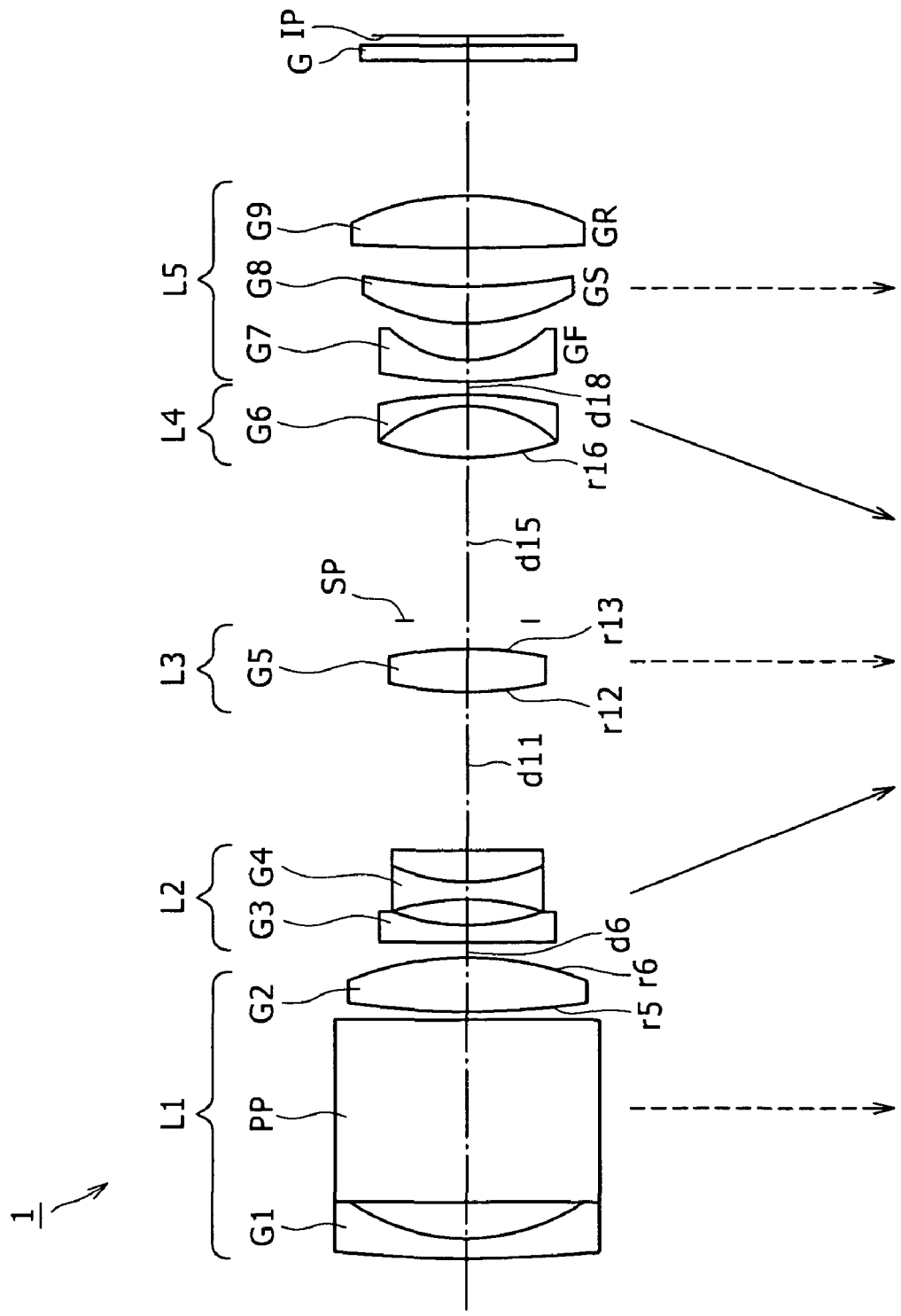
FIG. 1 is a view showing the lens arrangement of a zoom lens according to a first embodiment of the present invention.

The best mode for providing zoom lenses and an image capturing device according to the present invention will be described below with reference to the accompanying drawings.

A zoom lens according to the present invention includes a plurality of lens groups. The intervals between the lens groups are changed for variable power. The final lens group which is positioned most closely to the image side has a sub lens group GS having a positive refractive power and a sub lens group GR disposed adjacent to the sub lens group GS on the image side and having a positive refractive power. The sub lens group GS can be shifted in a direction perpendicular to the optical axis to correct image blurs. If the sub lens group GS has a lateral magnification $\beta s$ and the sub lens group GR has a lateral magnification $\beta R$, then these lateral magnifications satisfy the following conditional expressions (1), (2):

$$\beta S < 1 \tag{1}$$

$$0 < \beta R < 1 \tag{2}$$

The zoom lens according to the present invention resides in that the final lens group which is positioned most closely to the image side corrects image blurs.

There are generally two advantages achieved when the final lens group which is positioned most closely to the image side corrects image blurs. According to one of the advantages, the final lens group suffers little interference with actuating mechanisms for variable power, focusing, and aperture diaphragm, etc. An actuating mechanism for correcting image blurs is disposed near the position of an image plane where a relatively large space is available, making the zoom lens compatible with efforts to reduce the size thereof. According to the other advantage, since the lens group positioned more closely to the image side than a focusing group, a blur correcting coefficient is constant regardless of the position of the subject. As a lens shifting distance for correcting image blurs is uniquely determined solely by a magnification ratio, it is not necessary to detect the position of the focusing group, and a control process is simplified.

As described above, there has heretofore been proposed a zoom lens wherein the final lens group that is positioned most closely to the image side is shifted in its entirety in a direction perpendicular to the optical axis for correcting image blurs due to hand jiggling at the time the zoom lens is vibrated when capturing images with a camera. However, when the final lens group is shifted in its entirety in the direction perpendicular to the optical axis, it is inevitably positionally deviated along the optical axis to move the image plane, tending to cause defocusing.

A blur correcting coefficient as a value representing the proportion of an amount of image blur correction to a lens shift in the direction perpendicular to the optical axis is indicated by E, and a focusing sensitivity as a value representing the proportion of the distance by which an image plane moves to a positional deviation of a lens along the optical axis is indicated by P. Advantages of the present invention compared with the aforesaid technique of shifting the final lens group in its entirety will be described in detail below in terms of a value (P/E) produced by standardizing the focusing sensitivity P with the blur correcting coefficient E and the layout of refractive powers of partial lens groups in the final lens group. The magnitude of the absolute value of P/E (|P/E|) represents "susceptibility to defocusing" at the time the lens group serves as an image blur correcting lens group.

For the sake of brevity, the final lens group is made up of the sub lens group GS and the sub lens group GR positioned adjacent to the sub lens group GS on the image side. The sub lens group GS has the lateral magnification βS and the sub lens group GR has the lateral magnification βR. A lens shift of a lens group for correcting an image blur at a certain blur angle is uniquely determined by the relationship between the lateral magnification of the lens group and the lateral magnification of a lens group which is positioned more closely to the image side than the lens group. Therefore, for correcting an image blur by shifting the final lens group in its entirety or a sub lens group in the final lens group in a direction perpendicular to the optical axis, the blur correcting coefficient E and the focusing sensitivity P can expressed by βS and βR only.

A process of correcting an image blur with the entire final lens group that is positioned most closely to the image side, as with the conventional zoom lens described above, will be considered.

It is assumed that the final lens group is made up of the two partial lens groups GS, GR, for example. When an image blur is corrected by shifting the final lens group in its entirety, i.e., both the sub lens group GS and the sub lens group GR, in a direction perpendicular to the optical axis, the blur correcting coefficient E and the focusing sensitivity P are represented respectively by:

$$E = (1 - \beta S \cdot \beta R)$$

$$P = (1 - \beta S^2 \cdot \beta R^2)$$

where βS·βR represents the magnification of the entire final lens group.

For reducing the size of the optical system, the final lens group should preferably have a negative refractive power. However, since the focal length of the zoom lens system is positive at all times, βS·βR>1, i.e., |P/E|>1, tending to give rise to a defocusing.

In order to keep a balance between a small optical system size and defocusing, the final lens group may have a weak positive refractive power, so that βS·βR<1. In this case, however, inasmuch as the absolute value of the blur correcting coefficient E is small, the distance that the lens is actuated for correcting an image blur becomes very large.

For the above reasons, it is not preferable for the entire final lens group to isolate the zoom lens from vibrations, i.e., to correct hand jiggling, so as to make the optical system smaller in size.

With the zoom lens according to the present invention, of the final lens group positioned mostly closely to the image side, the sub lens group GS having the positive refractive power is shifted in the direction perpendicular to the optical axis to correct an image blur, and the sub lens group GR having the positive refractive power is placed adjacent to the sub lens group GS on the image side, so that the image blur can be corrected by actuating the blur correcting lens group, i.e., the sub lens group GS, over an appropriate distance, while reducing focusing sensitivity. The reasons for this will specifically be described below by comparing the magnitudes of values of |P/E|.

With the arrangement of the zoom lens according to the present invention, the blur correcting coefficient E and the focusing sensitivity P are represented respectively by:

$$E = (1 - \beta S) \cdot \beta R$$

$$P = (1 - \beta S^2) \cdot \beta R^2$$

As the focal length of the zoom lens system is positive at all times, light rays that pass through the sub lens group GS having the positive refractive power and the sub lens group GR having the positive refractive power are considered to be related to each other in two ways as described below.

According to one of the two ways, divergent light rays emitted from the sub lens group GS are converted into convergent light rays by the sub lens group GR and the convergent light rays are applied to the image plane (see FIG. 30(a)). According to the other way, weakly convergent light rays emitted from the sub lens group GS are converted into strongly convergent light rays by the sub lens group GR and the strongly convergent light rays are applied to the image plane (see FIG. 30(b)).

In the instance shown in FIG. 30(a), the divergent light rays emitted from the sub lens group GS pose limitations on efforts to make the optical system smaller in size. The relationships of 1<βs and βR<0 are satisfied at all times, and |1−βS|<|1−βS²|. Therefore, the value of |P/E| is large. If βR<−1, then |βR|<|βR|², and hence the value of |P/E| is larger. According to the present invention, the instance shown in FIG. 30(b) where the value of |P/E| can be reduced is selected.

In the instance shown in FIG. 30(b), the convergent light rays emitted from the sub lens group GS make it easy to reduce the size of the optical system. The above conditional expressions (1), (2) (presented below again):

$$\beta s < 1 \quad (1)$$

$$0 < \beta R < 1 \quad (2)$$

are satisfied at all times. Since $|\beta R| > |\beta R|^2$, the value of $|P/E|$ is small. If $-1 < \beta s < 0$, then $(1-\beta S) > 1 > (1-\beta S^2)$, and hence the value of $|P/E|$ is smaller. Therefore, the arrangement of the final lens group of the zoom lens according to the present invention is highly effective to reduce the value of $|P/E|$.

With the zoom lens according to the present invention, the final lens group should preferably have a sub lens group GF having a negative refractive power, disposed adjacent to the sub lens group GS on the object side.

Both the sub lens group GS and the sub lens group GR have a positive refractive power and make light rays convergent. Consequently, the power layout will not be effective if the light rays applied to the sub lens group GS are not sufficiently spread. The sub lens group GF having the negative refractive power is disposed adjacent to the sub lens group GS on the object side to keep the light rays applied to the sub lens group GS sufficiently spread and reduce the size of the optical system. Spreading the light rays with the sub lens group GF is highly effective in satisfying the relationship of $\beta s < 0$ at all times and reducing the value of $|P/E|$.

The zoom lens according to the present invention should preferably satisfy the following conditional expressions (3), (4):

$$-0.5 < \beta s < 0.5 \quad (3)$$

$$0.5 < \beta R < 1 \quad (4)$$

A zoom lens type that is suitable for use as the zoom lens according to the present invention should preferably have a final lens group fixed along the optical axis and have a main purpose which is to correct various aberrations, with the entire final lens group having a relatively weak refractive power. The lateral magnification $\beta s$ represents a quantity related to the refractive power of the sub lens group GS, and the lateral magnification $\beta R$ represents a quantity related to the refractive power of the sub lens group GR. The conditional expressions (3), (4) provide numerical ranges determined from a balance between an increase in the aberration performance and a reduction in the value of $|P/E|$ in the zoom lens type described above.

If only the numerical range of the lateral magnification $\beta s$ of the sub lens group GS is considered, then the range $\beta_s < -0.5$ described above is effective to reduce the value of $|P/E|$. However, since the light rays applied to the final lens group are convergent, achieving the range $\beta s < -0.5$ requires that the negative refractive power of the sub lens group which is positioned more closely to the object side than the sub lens group GS in the final lens group be extremely strong, and the effect of poor aberrations that occur is not negligible. Conversely, if $0.5 < \beta s$, then the absolute value of the blur correcting coefficient E itself is small. An appropriate value of the blur correcting coefficient E needs to be at least about 0.4 though it cannot flatly be determined as it depends upon the size of the actuating mechanism and the effective diameter of the lens. If $0.5 < \beta S$, then it is difficult to achieve a blur correcting coefficient of about 0.4. Under the circumstances, the conditional expression (3) is given according to the present invention.

The same argument applies to the numerical range of the lateral magnification $\beta R$ of the sub lens group GR. Specifically, the range $\beta R < 0.5$ is effective to reduce the value of $|P/E|$. However, the effect of poor aberrations is large, and the absolute value of the blur correcting coefficient E is small.

Under the circumstances, the conditional expression (4) is given according to the present invention.

If it is assumed that the lens surface of the sub lens group GS which is closest to the object side has a radius RS1 of curvature and the lens surface thereof which is closest to the image side has a radius RS2 of curvature, then the zoom lens according to the present invention should preferably satisfy the following conditional expression (5):

$$-3.0 < (RS1+RS2)/(RS1-RS2) < 1.5 \quad (5)$$

As the value of (RS1+RS2)/(RS1−RS2) (hereinafter referred to as "S.F." (shape factor)) is negatively larger, then the convex meniscus toward the object side is sharper. If the value of the S.F. is positively larger, then the convex meniscus toward the image side is sharper.

The conditional expression (5) indicates that if the sub lens group GS has a small convex meniscus toward the object side, then it has the best aberration performance at times including the time when an image blur is corrected.

Because the focal length of the entire zoom lens is positive, if the convex meniscus toward the object side is strong (S.F.<−3.0) or conversely if a convex meniscus toward the image side is provided (1.5<S.F.), then the spherical aberration is large, and the off-center aberration that occur when an image blur is corrected is also large. If the sub lens group GS has a convex meniscus toward the image side, then since the principal point is present more on the image side than if the sub lens group GS has a convex meniscus toward the object side, the sensitivity to the image plane is increased.

For the reasons described above, the zoom lens according to the present invention should preferably satisfy the conditional expression (5).

The first lens group which is positioned most closely to the object side in the zoom lens according to the present invention is also suitable for use in a bent optical system having a reflecting member for bending the optical axis through about 90 degrees. The bent optical system can easily be constructed to provide a large space near the final lens group, and is suitable for placing an actuating mechanism for correcting hand jiggling in the final lens group.

The zoom lens according to the present invention should preferably make a focusing action by moving, along the optical axis, a lens group which is positioned more closely to the image side than the aperture diaphragm. If a focusing action is made by a lens group which is positioned more closely to the object side than the aperture diaphragm, then the angle of field changes greatly in the focusing action.

The zoom lens according to the present invention includes a first lens group having a positive refractive power, a second lens group having a negative refractive power and movable along the optical axis for variable power, a third lens group having a positive refractive power, a fourth lens group having a positive refractive power and movable along the optical axis for keeping an image plane, which tends to vary upon movement of the second lens group and movement of the position of a subject, in a constant position, and a fifth lens group having a positive or negative refractive power as a final lens group, which lens groups are arranged successively from the object side. With this arrangement, the zoom lens is capable of producing high-quality images where aberrations are well corrected.

Zoom lenses according to embodiments of the present invention and numerical examples which are provided when specific numerical values are applied to the zoom lenses according to the embodiments will be described below.

In each of the embodiments, aspherical surfaces are employed. An aspherical surface is expressed by the following equation 1:

$$X = \frac{(Y/R)^2}{\sqrt{1+\{1-(Y/R)^2\}}} + AY^4 + BY^6 + CY^8 + DY^{10} \quad \text{[Equation 1]}$$

where Y represents the height in a direction perpendicular to the optical axis, X the distance from the lens surface along the optical axis, R the radius of curvature, and A, B, C, D aspherical coefficients of fourth order, sixth order, eighth order, and tenth order, respectively.

FIG. 1 is a view showing the lens arrangement of a zoom lens according to a first embodiment of the present invention. The zoom lens 1 includes a first lens group L1 having a positive refractive power, a second lens group L2 having a negative refractive power and movable along the optical axis for variable power, a third lens group L3 having a positive refractive power, a fourth lens group L4 having a positive refractive power and movable along the optical axis for keeping an image plane, which would tend to vary upon movement of the second lens group L2 and movement of the position of a subject, in a constant position, and a fifth lens group L5 having a positive refractive power, which lens groups are arranged successively from the object side. The first lens group L1 includes a negative meniscus lens G1 which is convex toward the object side, a prism PP for bending the optical axis through 90 degrees, and a positive lens G2 having both surfaces as aspherical convex surfaces. The second lens group L2 includes a negative meniscus lens G3 which is convex toward the object side, and a cemented lens G4 made up of a biconcave negative lens and a positive lens which is convex toward the object side. The third lens group L3 includes a positive lens G5 having both surfaces constructed as aspherical convex surfaces. The fourth lens group L4 includes a cemented positive lens G6 made up of a biconvex positive lens having an aspherical surface toward the objective side and a negative meniscus lens having a concave surface toward the object side. The fifth lens group L5 includes a negative meniscus lens G7 having a convex surface toward the object side, a positive meniscus lens G8 having a convex surface toward the object side, and a biconvex positive lens L9. An aperture diaphragm SP, which is fixed along the optical axis when the magnification is varied, is disposed on the image side of the third lens group L3.

The negative meniscus lens G7 of the fifth lens group L5 serves as the sub lens group GF, the positive meniscus lens G8 as the sub lens group GS, and the positive lens G9 as the sub lens group GR. The positive meniscus lens G8 (the sub lens group GS) can be shifted in a direction perpendicular to the optical axis for correcting image blurs.

In FIG. 1, IP represents a focusing plane, and G a cover glass.

Table 1 shows various specification values of a numerical example 1 which is based on specific numerical values as applied to the first embodiment. In the tables of specification values of the numerical example 1 and the numerical examples to be described below, "ri" represents the radius of curvature of an ith optical surface from the object side, "di" the on-axis surface-to-surface distance between the ith optical surface and an (i+1)th optical surface from the object side, "ni" the refractive index with respect to the d line (λ=587.6 nm) of a glass material having the ith optical surface on the object side, and "vi" the Abbe number with respect to the d line of the glass material having the ith optical surface on the object side. "∞" indicates that the optical axis is planar, "f" the focal length, "Fno." the F number, and "ω" the half angle of field.

TABLE 1 f = 6.00~16.80 Fno = 3.60~4.06 2ω = 62.96°~23.21°

| | | | | | | | |
|---|---|---|---|---|---|---|---|
| r1 = | 32.1219 | d1 = | 0.801 | n1 = | 1.92286 | v1 = | 20.9 |
| r2 = | 8.2209 | d2 = | 1.472 | | | | |
| r3 = | ∞ | d3 = | 7.200 | n3 = | 1.83500 | v3 = | 43.0 (プリズム)1 |
| r4 = | ∞ | d4 = | 0.200 | | | | |
| r5 = | 14.8006 | d5 = | 2.204 | n5 = | 1.77250 | v5 = | 49.6 |
| r6 = | −15.2204 | d6 = | 0.500 | | | | |
| r7 = | 26.8518 | d7 = | 0.844 | n7 = | 1.88300 | v7 = | 40.8 |
| r8 = | 7.1255 | d8 = | 1.079 | | | | |
| r9 = | −9.3761 | d9 = | 0.655 | n9 = | 1.80420 | v9 = | 46.5 |
| r10 = | 8.4327 | d10 = | 1.233 | n10 = | 1.92286 | v10 = | 20.9 |
| r11 = | 44.4126 | d11 = | 6.263 | | | | |
| r12 = | 11.7630 | d12 = | 1.647 | n12 = | 1.77250 | v12 = | 49.6 |
| r13 = | −20.7255 | d13 = | 1.038 | | | | |
| r14 = | ∞ | d14 = | 1.000 | | | | (絞り)2 |
| r15 = | ∞ | d15 = | 5.636 | | | | |
| r16 = | 12.6525 | d16 = | 1.886 | n16 = | 1.69680 | v16 = | 55.5 |
| r17 = | −5.0728 | d17 = | 0.500 | n17 = | 1.90366 | v17 = | 31.3 |
| r18 = | −16.2509 | d18 = | 0.50 | | | | |
| r19 = | 17.8924 | d19 = | 0.801 | n19 = | 1.92286 | v19 = | 20.9 |
| r20 = | 4.7885 | d20 = | 1.471 | | | | |
| r21 = | 7.1996 | d21 = | 1.548 | n21 = | 1.48749 | v21 = | 70.4 |
| r22 = | 22.4282 | d22 = | 1.472 | | | | |
| r23 = | 34.8728 | d23 = | 2.049 | n23 = | 1.48749 | v23 = | 70.4 |
| r24 = | −10.6138 | d24 = | 5.313 | | | | |
| r25 = | ∞ | d25 = | 0.500 | n25 = | 1.51680 | v25 = | 64.2 |
| r26 = | ∞ | d26 = | 0.500 | | | | |
| r27 = | ∞ | d27 = | | | | | |

1: (prism)
2: (diaphragm)

As the lens positions change from the wide-angle end to the telephoto end, the surface-to-surface distance d6 between the first lens group L1 and the second lens group L2, the surface-to-surface distance d11 between the second lens group L2 and the third lens group L3, the surface-to-surface distance d15 between the aperture diaphragm SP and the fourth lens group L4, and the surface-to-surface distance d18 between the fourth lens group L4 and the fifth lens group L5 change. Table 2 shows values of the above surface-to-surface distances of the numerical example 1 at the wide-angle end, the intermediate focal length between the wide-angle end and the telephoto end, and the telephoto end, together with focal lengths f.

TABLE 2

| | f = 6.00 | f = 10.04 | f = 16.80 |
|---|---|---|---|
| d6 | 0.500 | 3.833 | 7.304 |
| d11 | 6.263 | 2.754 | 0.500 |
| d15 | 5.636 | 3.159 | 0.352 |
| d18 | 0.500 | 3.153 | 4.743 |

The 5th, 6th, 12th, 13th, and 16th lens surfaces include aspherical surfaces r5, r6, r12, r13, and r16, respectively. The aspherical coefficients of the above surfaces of the numerical example 1 are shown in Table 3. In Table 3 and tables of aspherical coefficients shown below, "E-i" represents an exponential expression with a base of 10, i.e., "$10^{-i}$", e.g., "0.12345E−05" or "0.12345×$10^{-5}$".

TABLE 3

| | | | | | | | | |
|---|---|---|---|---|---|---|---|---|
| r5 | A = | −1.37497E−04 | B = | 3.21429E−06 | C = | −4.10540E−08 | D = | −1.35020E−08 |
| r6 | A = | −6.64803E−05 | B = | 7.13347E−06 | C = | −3.35202E−07 | D = | −5.37311E−09 |
| r12 | A = | −2.18853E−04 | B = | −1.82237E−05 | C = | −4.63754E−07 | D = | 5.43804E−08 |
| r13 | A = | 3.02315E−05 | B = | −1.66400E−05 | C = | −1.23667E−06 | D = | 1.24229E−07 |
| r16 | A = | −3.07477E−05 | B = | 1.99831E−05 | C = | −1.58158E−06 | D = | 8.38095E−08 |

Figure 2:
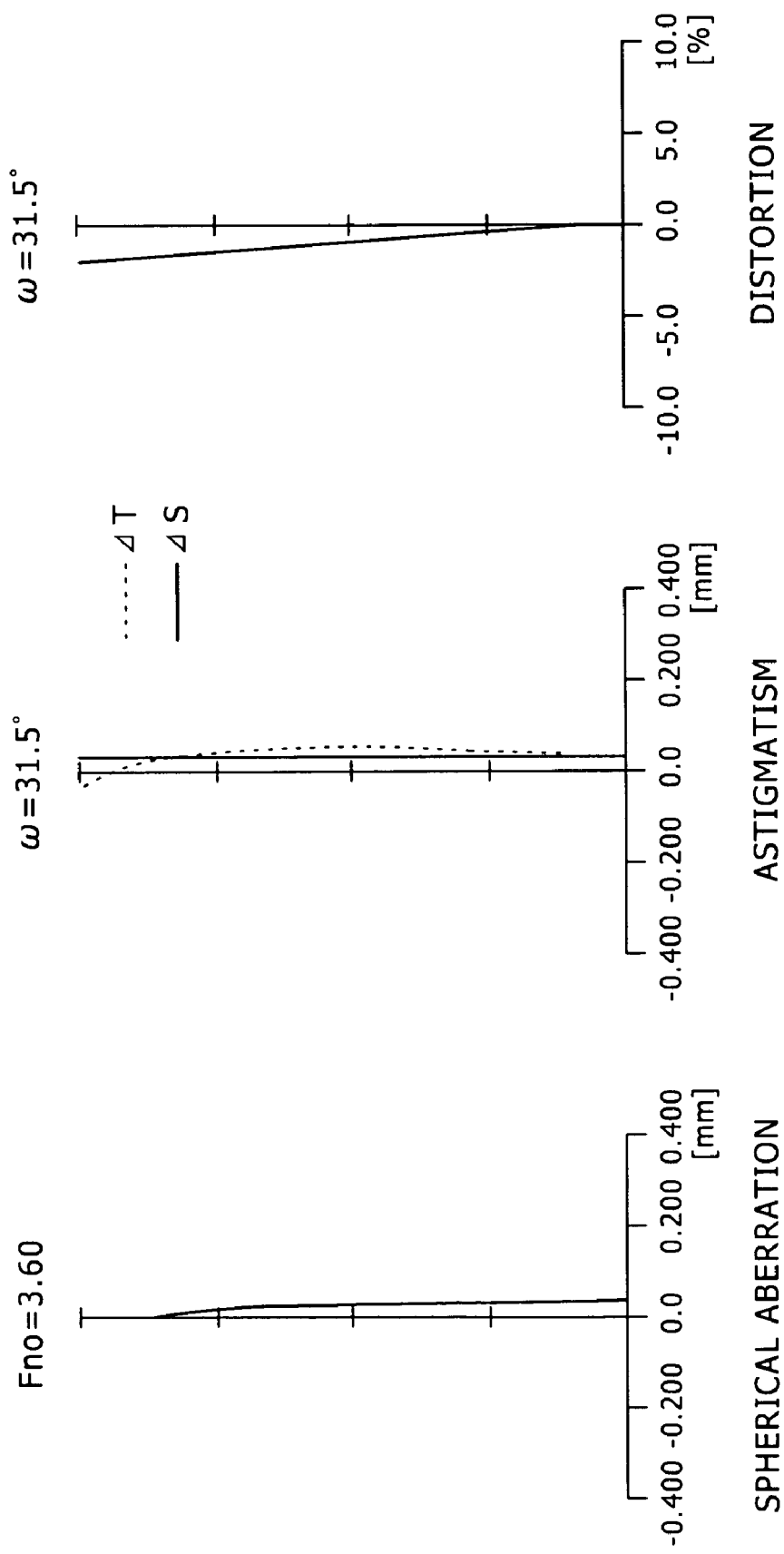
FIG. 2 is a diagram showing, together with FIGS. 3 through 7, various aberrations of a numerical example 1 which is provided when specific numerical values are applied to the zoom lens according to the first embodiment of the present invention, the view showing spherical aberration, astigmatism, and distortion at a wide-angle end.
Figure 3:
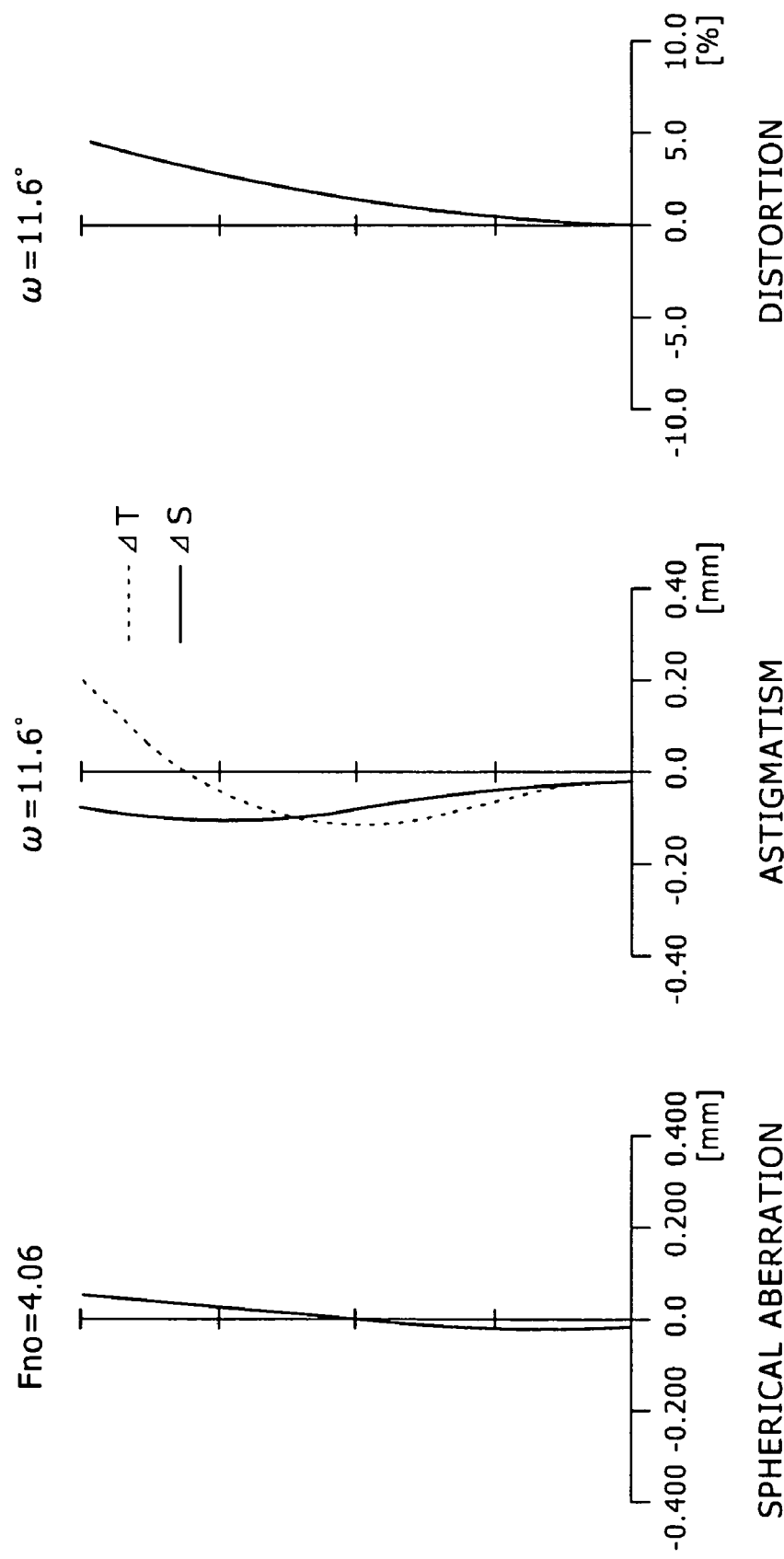
FIG. 3 is a diagram showing spherical aberration, astigmatism, and distortion at a telephoto end.
Figure 7:
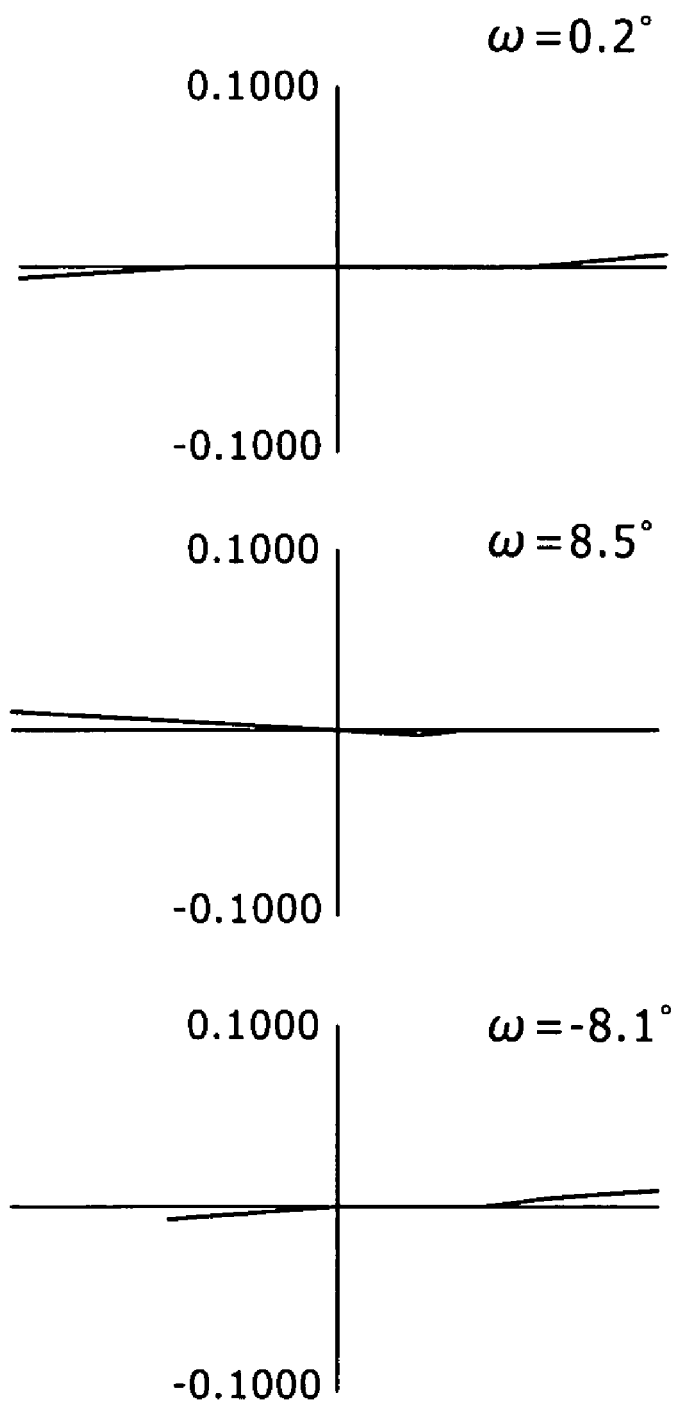
FIG. 7 is a diagram showing lateral aberrations when an image blur of 0.2 degree is corrected at the telephoto end.

FIGS. 2 through 7 are diagrams showing aberrations of the numerical example 1. FIG. 2 shows spherical aberration, astigmatism, and distortion at the wide-angle end. FIG. 3 shows spherical aberration, astigmatism, and distortion at the telephoto end. In the astigmatism diagram, the solid-line curve represents a sagittal image plane, and the broken-line curve a tangential image plane. FIG. 4 shows lateral aberrations at the wide-angle end, FIG. 5 shows lateral aberrations at the telephoto end, FIG. 6 shows lateral aberrations when an image blur of 0.2 degree is corrected at the wide-angle end, and FIG. 7 shows lateral aberrations when an image blur of 0.2 degree is corrected at the telephoto end.

Figure 8:
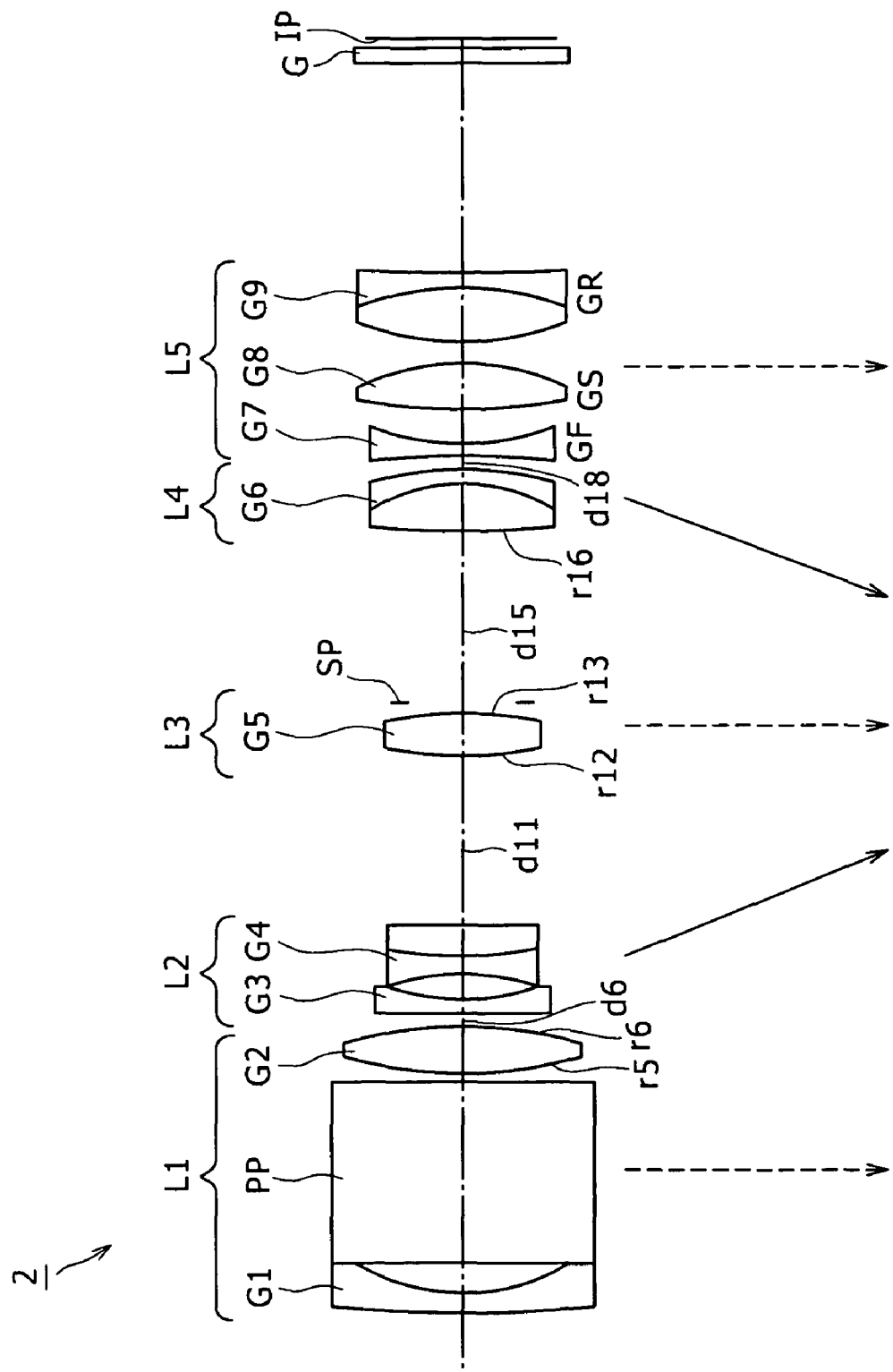
FIG. 8 is a view showing the lens arrangement of a zoom lens according to a second embodiment of the present invention.

FIG. 8 is a view showing the lens arrangement of a zoom lens according to a second embodiment of the present invention. The zoom lens 2 includes a first lens group L1 having a positive refractive power, a second lens group L2 having a negative refractive power and movable along the optical axis for variable power, a third lens group L3 having a positive refractive power, a fourth lens group L4 having a positive refractive power and movable along the optical axis for keeping an image plane, which would tend to vary upon movement of the second lens group and movement of the position of a subject, in a constant position, and a fifth lens group L5 having a positive refractive power, which lens groups are arranged successively from the object side. The first lens group L1 includes a negative meniscus lens G1 which is convex toward the object side, a prism PP for bending the optical axis through 90 degrees, and a positive lens G2 having both surfaces as aspherical convex surfaces. The second lens group L2 includes a negative meniscus lens G3 which is convex toward the object side, and a cemented negative lens G4 made up of a biconcave negative lens and a biconvex positive lens. The third lens group L3 includes a positive lens G5 having both surfaces as aspherical convex surfaces. The fourth lens group L4 includes a cemented positive lens made up of a biconvex positive lens having an aspherical surface toward the objective side and a negative meniscus lens having a convex surface toward the image side. The fifth lens group L5 includes a biconcave negative lens G7, a biconvex positive lens G8, and a cemented positive lens G9 made up of a biconvex positive lens and a biconcave negative lens. An aperture diaphragm SP, which is fixed along the optical axis when the magnification is varied, is disposed on the image side of the third lens group L3.

The negative lens G7 of the fifth lens group L5 serves as the sub lens group GF, the positive lens G8 as the sub lens group GS, and the cemented positive lens G9 as the sub lens group GR. The positive lens G8 (the sub lens group GS) can be shifted in a direction perpendicular to the optical axis for correcting image blurs.

In FIG. 8, IP represents a focusing plane, and G a cover glass.

Table 4 shows various specification values of a numerical example 2 which is based on specific numerical values as applied to the second embodiment.

TABLE 4 f = 6.00~16.80 Fno = 3.60~4.41 2ω = 65.74°~23.61°

| r1 = | 57.3576 | d1 = | 0.632 | n1 = | 1.92286 | v1 = | 20.9 | |
| r2 = | 9.4363 | d2 = | 1.227 | | | | | |
| r3 = | ∞ | d3 = | 7.200 | n3 = | 1.83500 | v3 = | 43.0 | ( )1 |
| r4 = | ∞ | d4 = | 0.200 | | | | | |
| r5 = | 13.2996 | d5 = | 1.857 | n5 = | 1.77250 | v5 = | 49.6 | |
| r6 = | −16.4905 | d6 = | 0.500 | | | | | |
| r7 = | 30.0737 | d7 = | 0.500 | n7 = | 1.88300 | v7 = | 40.8 | |
| r8 = | 7.0152 | d8 = | 1.006 | | | | | |
| r9 = | −8.1845 | d9 = | 0.683 | n9 = | 1.80420 | v9 = | 46.5 | |
| r10 = | 14.0737 | d10 = | 1.225 | n10 = | 1.92286 | v10 = | 20.9 | |
| r11 = | −62.7970 | d11 = | 6.733 | | | | | |
| r12 = | 18.4118 | d12 = | 1.441 | n12 = | 1.77250 | v12 = | 49.6 | |
| r13 = | −19.4210 | d13 = | 0.690 | | | | | |
| r14 = | ∞ | d14 = | 1.000 | | | | | (* )2 |
| r15 = | ∞ | d15 = | 5.627 | | | | | |
| r16 = | 29.5633 | d16 = | 1.943 | n16 = | 1.69680 | v16 = | 55.5 | |
| r17 = | −6.2219 | d17 = | 0.500 | n17 = | 1.90366 | v17 = | 31.3 | |
| r18 = | −14.1356 | d18 = | 0.500 | | | | | |
| r19 = | −46.0679 | d19 = | 0.500 | n19 = | 1.73159 | v19 = | 30.5 | |
| r20 = | 10.0796 | d20 = | 1.404 | | | | | |
| r21 = | 23.3469 | d21 = | 1.601 | n21 = | 1.50119 | v21 = | 68.9 | |
| r22 = | −10.2912 | d22 = | 0.950 | | | | | |
| r23 = | 10.5588 | d23 = | 2.083 | n23 = | 1.48749 | v23 = | 70.4 | |
| r24 = | −11.8712 | d24 = | 0.639 | n24 = | 1.75137 | v24 = | 27.7 | |
| r25 = | 36.4728 | d25 = | 8.013 | | | | | |
| r26 = | ∞ | d26 = | 0.500 | n26 = | 1.51680 | v26 = | 64.2 | |
| r27 = | ∞ | d27 = | 0.500 | | | | | |
| r28 = | ∞ | d28 = | 0.000 | | | | | |

1: (prism)
2: (diaphragm)

As the lens positions change from the wide-angle end to the telephoto end, the surface-to-surface distance d6 between the first lens group L1 and the second lens group L2, the surface-to-surface distance d11 between the second lens group L2 and the third lens group L3, the surface-to-surface distance d15 between the aperture diaphragm SP and the fourth lens group L4, and the surface-to-surface distance d18 between the fourth lens group L4 and the fifth lens group L5 change. Table 5 shows values of the above surface-to-surface distances of the numerical example 2 at the wide-angle end, the intermediate focal length between the wide-angle end and the telephoto end, and the telephoto end, together with focal lengths f.

TABLE 5

| | f = 6.00 | f = 10.04 | f = 16.80 |
|---|---|---|---|
| d6 | 0.500 | 3.157 | 6.329 |
| d11 | 6.733 | 2.996 | 0.545 |
| d15 | 5.627 | 3.219 | 0.200 |
| d18 | 0.500 | 3.989 | 6.286 |

The 5th, 6th, 12th, 13th, and 16th lens surfaces include aspherical surfaces r5, r6, r12, r13, and r16, respectively. The aspherical coefficients of the above surfaces of the numerical example 2 are shown in Table 6.

TABLE 6

| | | | | | | | |
|---|---|---|---|---|---|---|---|
| r5 | A = −1.63611E−04 | B = | 1.68874E−05 | C = | −1.15760E−06 | D = | 3.17852E−08 |
| r6 | A = −2.65291E−05 | B = | 1.54660E−05 | C = | −1.08027E−06 | D = | 3.05471E−08 |
| r12 | A = −5.90194E−04 | B = | −1.69404E−05 | C = | −2.47936E−06 | D = | 2.04550E−08 |
| r13 | A = −4.35268E−04 | B = | −1.37396E−05 | C = | −2.57609E−06 | D = | 4.90907E−08 |
| r16 | A = −5.40071E−05 | B = | 7.72400E−06 | C = | −6.02809E−07 | D = | 2.22078E−08 |

Figure 9:
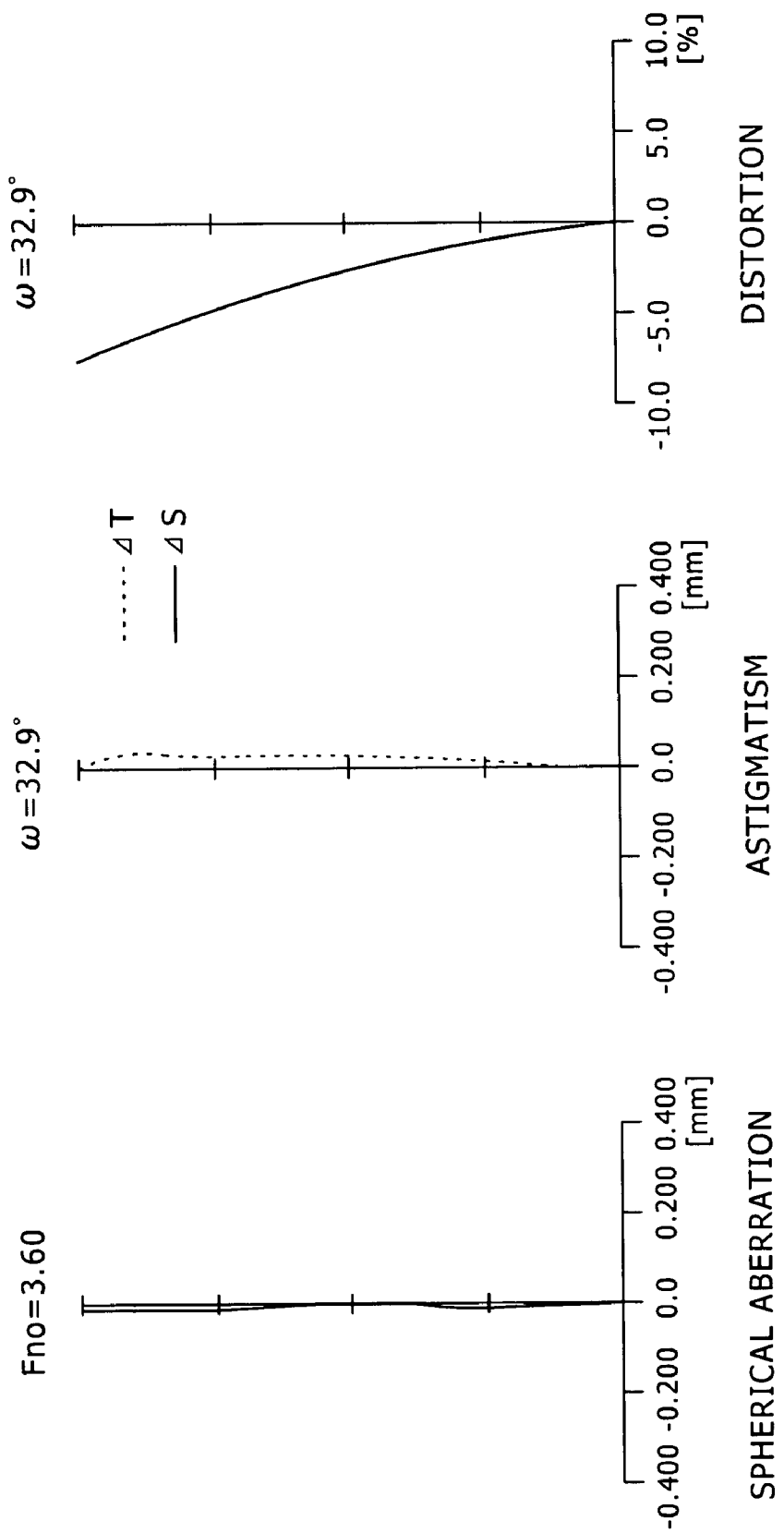
FIG. 9 is a diagram showing, together with FIGS. 10 through 14, various aberrations of a numerical example 2 which is provided when specific numerical values are applied to the zoom lens according to the second embodiment of the present invention, the view showing spherical aberration, astigmatism, and distortion at a wide-angle end.

FIGS. 9 through 14 are diagrams showing aberrations of the numerical example 2. FIG. 9 shows spherical aberration, astigmatism, and distortion at the wide-angle end. FIG. 10 shows spherical aberration, astigmatism, and distortion at the telephoto end. In the astigmatism diagram, the solid-line curve represents a sagittal image plane, and the broken-line curve a tangential image plane. FIG. 11 shows lateral aberrations at the wide-angle end, FIG. 12 shows lateral aberrations at the telephoto end, FIG. 13 shows lateral aberrations when an image blur of 0.2 degree is corrected at the wide-angle end, and FIG. 14 shows lateral aberrations when an image blur of 0.2 degree is corrected at the telephoto end.

Figure 15:
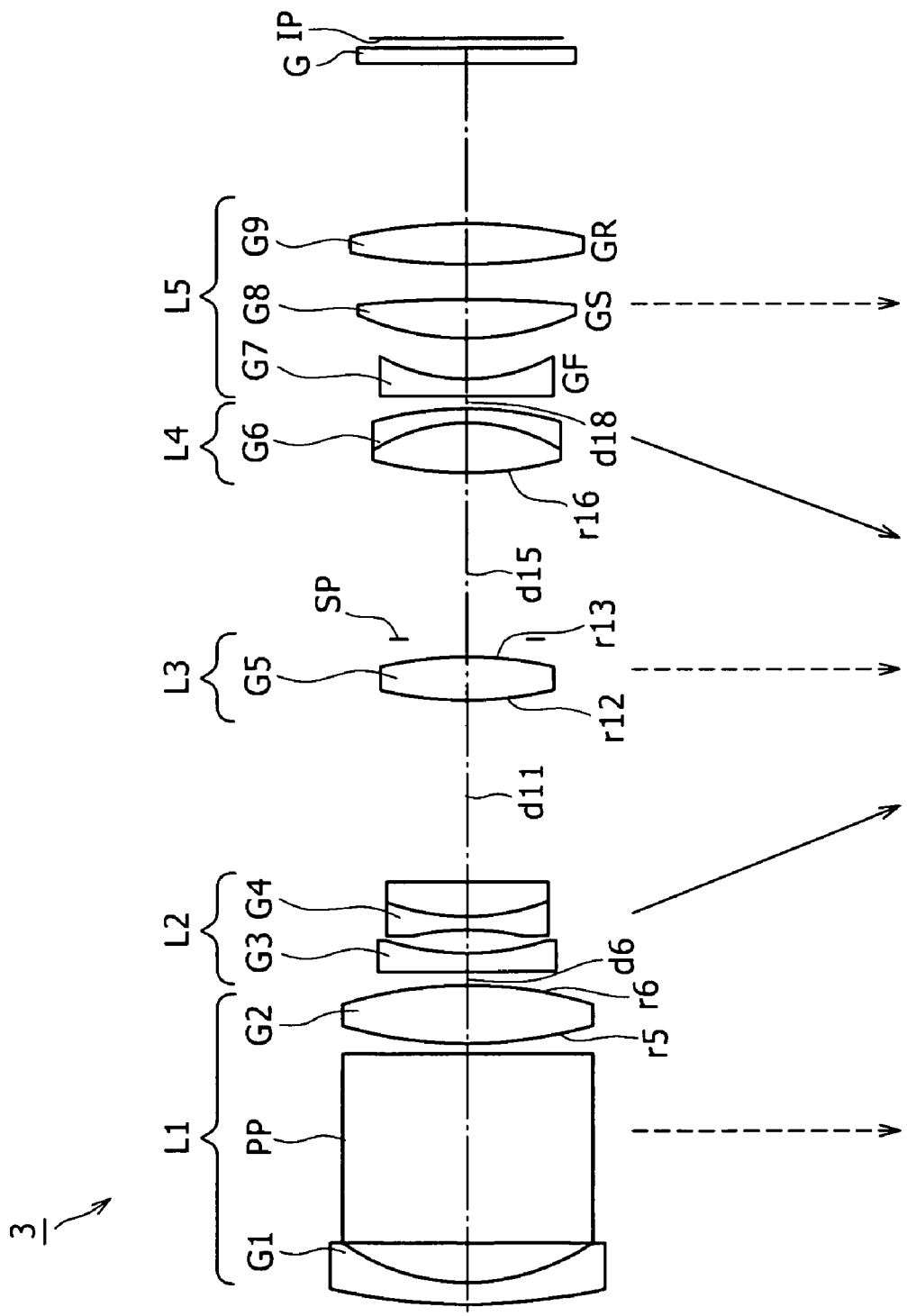
FIG. 15 is a view showing the lens arrangement of a zoom lens according to a third embodiment of the present invention.

FIG. 15 is a view showing the lens arrangement of a zoom lens according to a third embodiment of the present invention. The zoom lens 3 includes a first lens group L1 having a positive refractive power, a second lens group L2 having a negative refractive power and movable along the optical axis for variable power, a third lens group L3 having a positive refractive power, a fourth lens group L4 having a positive refractive power and movable along the optical axis for keeping an image plane, which would tend to vary upon movement of the second lens group and movement of the position of a subject, in a constant position, and a fifth lens group L5 having a negative refractive power, which lens groups are arranged successively from the object side. The first lens group L1 includes a negative meniscus lens G1 which is convex toward the object side, a prism PP for bending the optical axis through 90 degrees, and a biconvex positive lens G2 having both surfaces as aspherical convex surfaces. The second lens group L2 includes a negative meniscus lens G3 which is convex toward the object side, and a cemented lens made up of a biconcave negative lens and a positive meniscus lens which is concave toward the image side. The third lens group L3 includes a biconvex positive lens G5 having both surfaces as aspherical convex surfaces. The fourth lens group L4 includes a cemented positive lens G6 made up of a biconvex positive lens having an aspherical surface toward the objective side and a negative meniscus lens having a convex surface toward the image side. The fifth lens group L5 includes a biconcave negative lens G7, a biconvex positive lens G8, and a biconvex positive lens G9. An aperture diaphragm SP, which is fixed along the optical axis when the magnification is varied, is disposed on the image side of the third lens group L3.

The negative lens G7 of the fifth lens group L5 serves as the sub lens group GF, the positive lens G8 as the sub lens group GS, and the positive lens G9 as the sub lens group GR. The positive lens G8 (the sub lens group GS) can be shifted in a direction perpendicular to the optical axis for correcting image blurs.

In FIG. 15, IP represents a focusing plane, and G a cover glass.

Table 7 shows various specification values of a numerical example 3 which is based on specific numerical values as applied to the third embodiment.

TABLE 7 f = 6.00~16.80 Fno = 3.60~4.03 2ω = 63.52°~23.50°

| | | | | | | | |
|---|---|---|---|---|---|---|---|
| r1 = | 20.2816 | d1 = | 0.800 | n1 = | 1.92286 | v1 = | 20.9 |
| r2 = | 7.2151 | d2 = | 1.581 | | | | |
| r3 = | ∞ | d3 = | 7.200 | n3 = | 1.83500 | v3 = | 43.0 (プリズム)1 |
| r4 = | ∞ | d4 = | 0.283 | | | | |
| r5 = | 16.7513 | d5 = | 2.183 | n5 = | 1.77250 | v5 = | 49.6 |
| r6 = | −15.4553 | d6 = | 0.500 | | | | |
| r7 = | 206.7025 | d7 = | 0.701 | n7 = | 1.88300 | v7 = | 40.8 |
| r8 = | 9.1328 | d8 = | 0.842 | | | | |
| r9 = | −14.4557 | d9 = | 0.500 | n9 = | 1.80420 | v9 = | 46.5 |
| r10 = | 8.7736 | d10 = | 1.212 | n10 = | 1.92286 | v10 = | 20.9 |
| r11 = | 29.7228 | d11 = | 6.927 | | | | |
| r12 = | 11.3658 | d12 = | 1.495 | n12 = | 1.81600 | v12 = | 46.6 |
| r13 = | −27.3628 | d13 = | 0.809 | | | | |
| r14 = | ∞ | d14 = | 1.000 | | | | (絞り)2 |
| r15 = | ∞ | d15 = | 5.195 | | | | |
| r16 = | 10.7122 | d16 = | 1.677 | n16 = | 1.69680 | v16 = | 55.5 |
| r17 = | −6.5804 | d17 = | 0.500 | n17 = | 1.88300 | v17 = | 40.8 |
| r18 = | −20.8793 | d18 = | 0.763 | | | | |
| r19 = | −120.1746 | d19 = | 0.500 | n19 = | 1.92286 | v19 = | 20.9 |
| r20 = | 5.7933 | d20 = | 1.560 | | | | |
| r21 = | 9.5580 | d21 = | 1.459 | n21 = | 1.48749 | v21 = | 70.4 |
| r22 = | −37.5750 | d22 = | 1.247 | | | | |
| r23 = | 18.1603 | d23 = | 1.621 | n23 = | 1.48749 | v23 = | 70.4 |
| r24 = | −21.4035 | d24 = | 5.863 | | | | |
| r25 = | ∞ | d25 = | 0.500 | n25 = | 1.51680 | v25 = | 64.2 |
| r26 = | ∞ | d26 = | 0.500 | | | | |
| r27 = | ∞ | d27 = | | | | | |

1: (prism)
2: (diaphragm)

As the lens positions change from the wide-angle end to the telephoto end, the surface-to-surface distance d6 between the first lens group L1 and the second lens group L2, the surface-to-surface distance d11 between the second lens group L2 and the third lens group L3, the surface-to-surface distance d15 between the aperture diaphragm SP and the fourth lens group L4, and the surface-to-surface distance d18 between the fourth lens group L4 and the fifth lens group L5 change. Table 8 shows values of the above surface-to-surface distances of the numerical example 3 at the wide-angle end, the intermediate focal length between the wide-angle end and the telephoto end, and the telephoto end, together with focal lengths f.

TABLE 8

| | f = 6.00 | f = 10.04 | f = 16.80 |
|---|---|---|---|
| d6 | 0.500 | 4.410 | 8.085 |
| d11 | 6.927 | 3.082 | 0.500 |
| d15 | 5.195 | 2.944 | 0.200 |
| d18 | 0.763 | 2.950 | 4.601 |

The 5th, 6th, 12th, 13th, and 16th lens surfaces include aspherical surfaces r5, r6, r12, r13, and r16, respectively. The aspherical coefficients of the above surfaces of the numerical example 3 are shown in Table 9.

TABLE 9

| | | | | | | | | |
|---|---|---|---|---|---|---|---|---|
| r5 | A = | −9.74315E−05 | B = | 4.26731E−08 | C = | 2.06705E−08 | D = | −6.15153E−09 |
| r6 | A = | −8.43346E−05 | B = | 1.88987E−06 | C = | −1.03418E−07 | D = | −2.79223E−09 |
| r12 | A = | −4.58625E−04 | B = | −1.50826E−05 | C = | −7.82015E−07 | D = | −6.59676E−08 |
| r13 | A = | −3.00769E−04 | B = | −6.91038E−06 | C = | −2.17307E−06 | D = | 2.40485E−08 |
| r16 | A = | −1.50825E−04 | B = | 9.01371E−06 | C = | −8.12611E−07 | D = | 3.82105E−08 |

Figure 16:
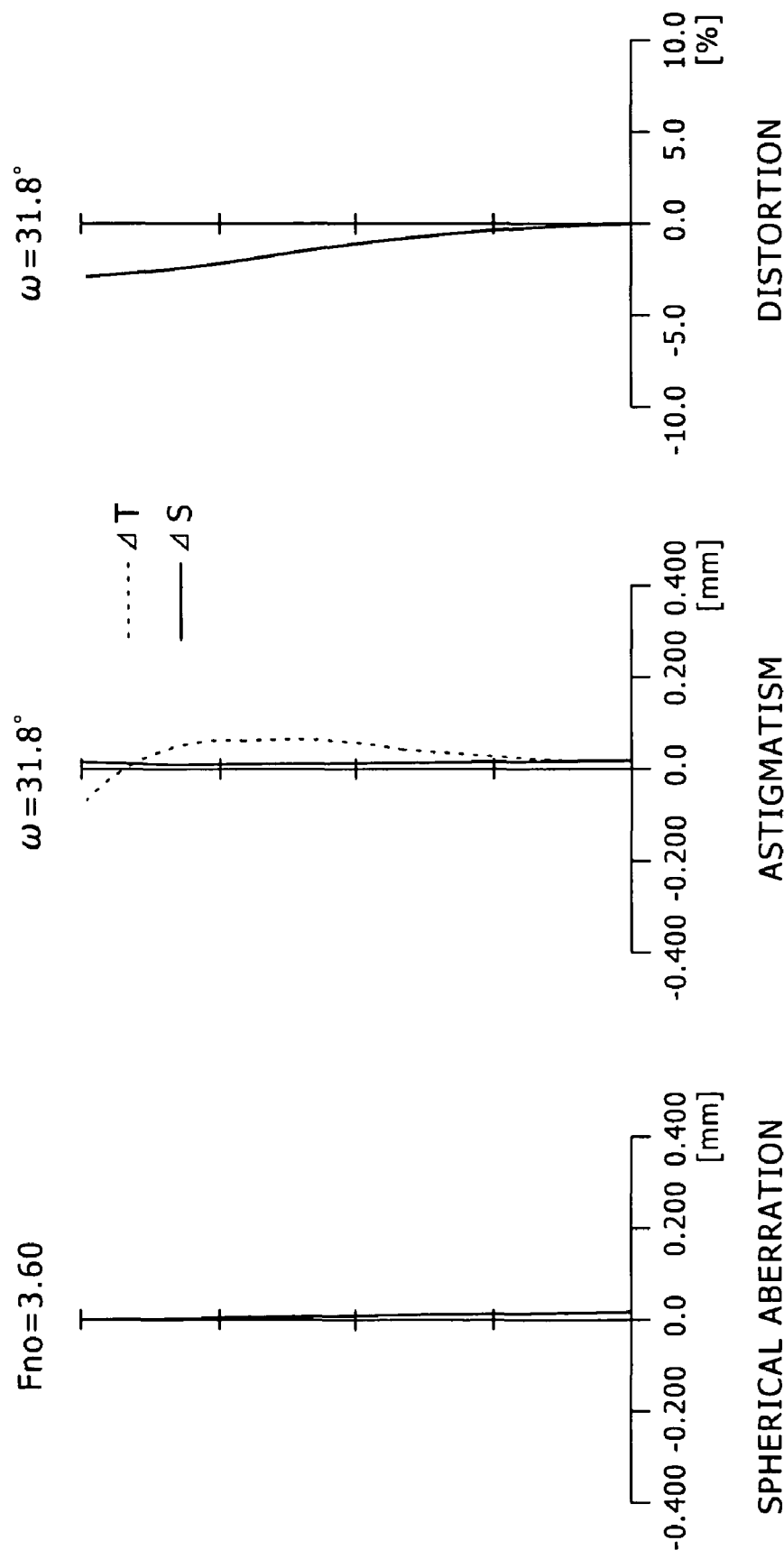
FIG. 16 is a diagram showing, together with FIGS. 17 through 21, various aberrations of a numerical example 3 which is provided when specific numerical values are applied to the zoom lens according to the third embodiment of the present invention, the view showing spherical aberration, astigmatism, and distortion at a wide-angle end.
Figure 17:
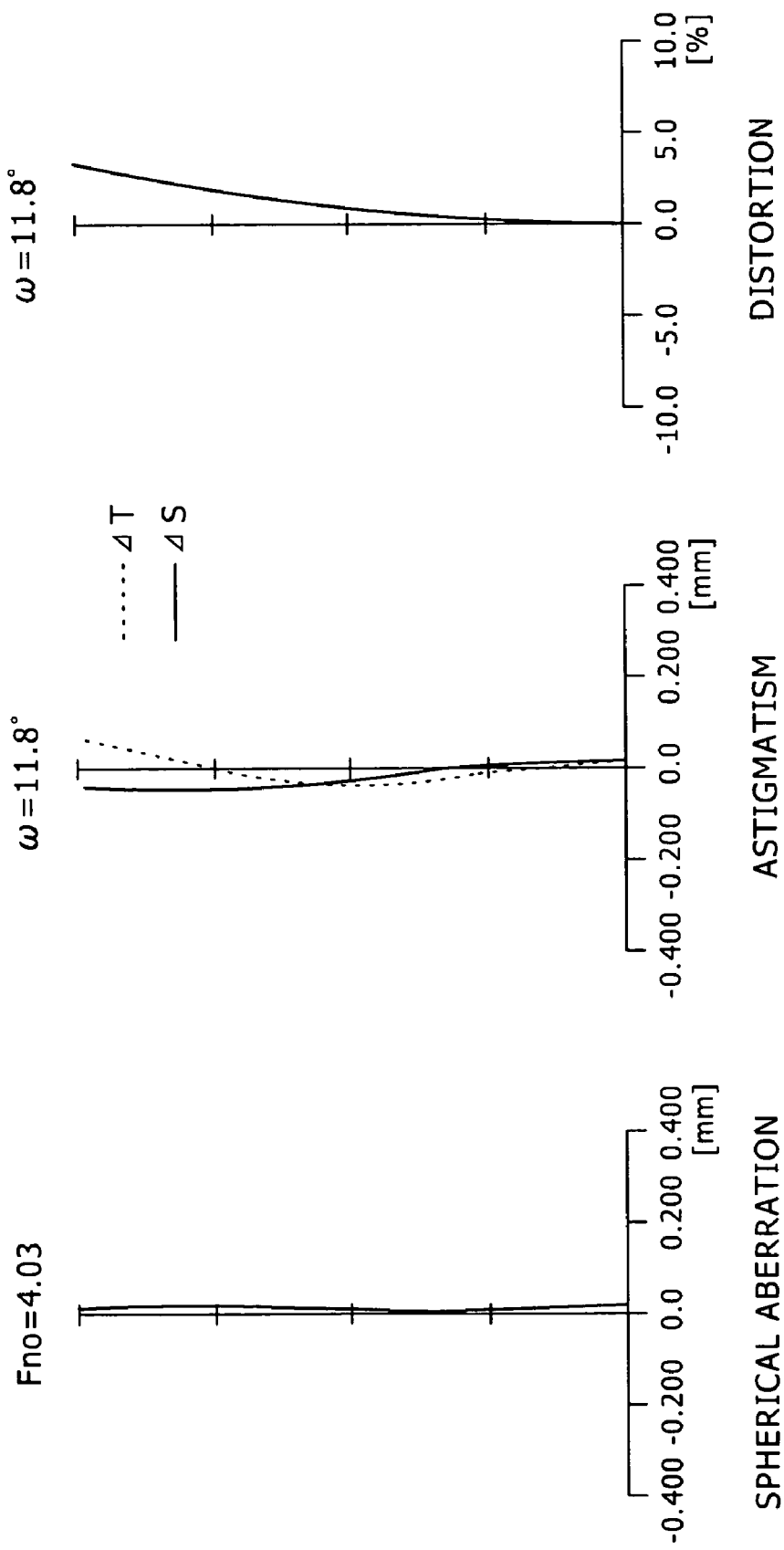
FIG. 17 is a diagram showing spherical aberration, astigmatism, and distortion at a telephoto end.

FIGS. 16 through 21 are diagrams showing aberrations of the numerical example 3. FIG. 16 shows spherical aberration, astigmatism, and distortion at the wide-angle end. FIG. 17 shows spherical aberration, astigmatism, and distortion at the telephoto end. In the astigmatism diagram, the solid-line curve represents a sagittal image plane, and the broken-line curve a tangential image plane. FIG. 18 shows lateral aberrations at the wide-angle end, FIG. 19 shows lateral aberrations at the telephoto end, FIG. 20 shows lateral aberrations when an image blur of 0.2 degree is corrected at the wide-angle end, and FIG. 21 shows lateral aberrations when an image blur of 0.2 degree is corrected at the telephoto end.

Figure 22:
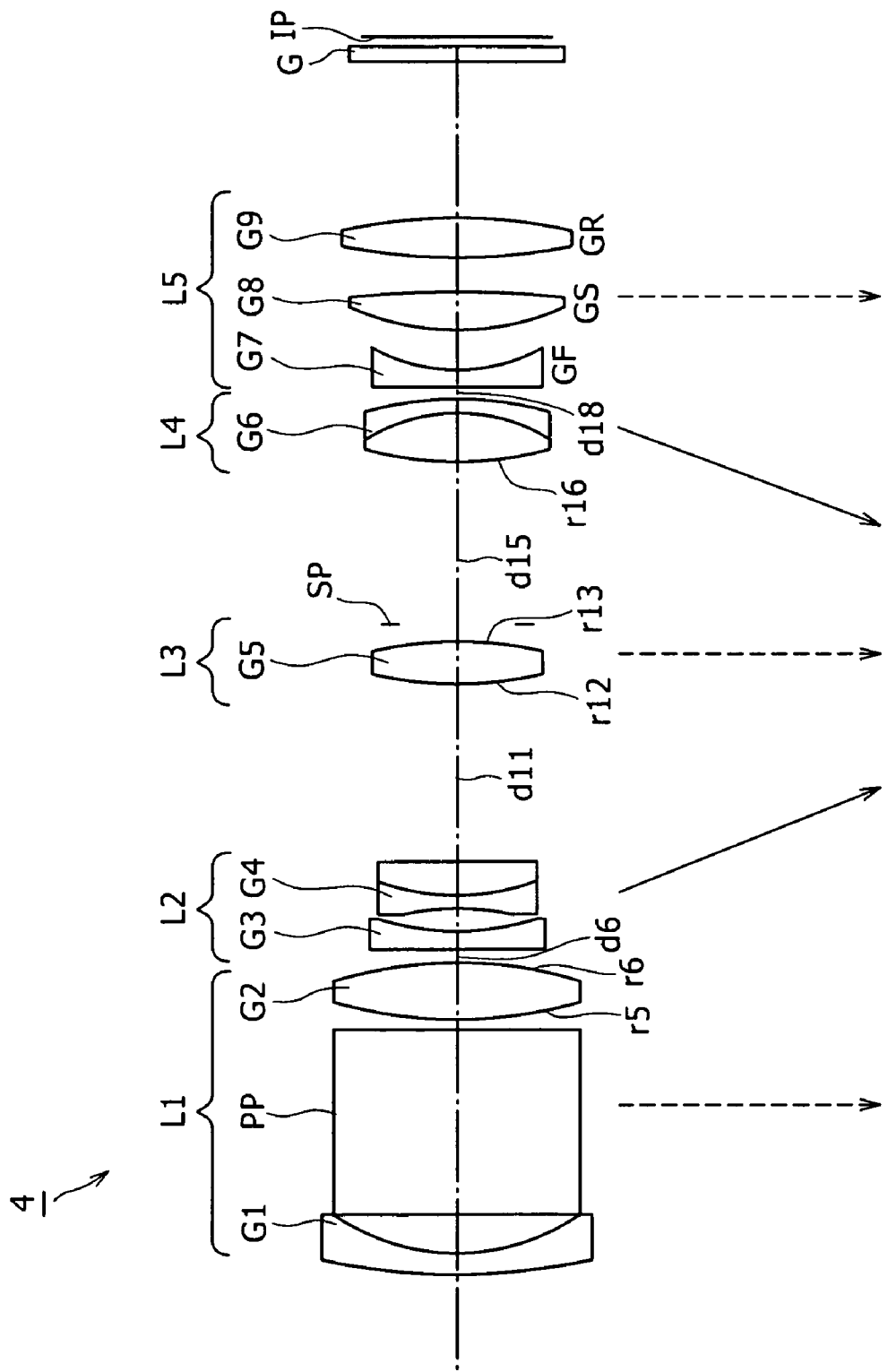
FIG. 22 is a view showing the lens arrangement of a zoom lens according to a fourth embodiment of the present invention.

FIG. 22 is a view showing the lens arrangement of a zoom lens according to a fourth embodiment of the present invention. The zoom lens 4 includes a first lens group L1 having a positive refractive power, a second lens group L2 having a negative refractive power and movable along the optical axis for variable power, a third lens group L3 having a positive refractive power, a fourth lens group L4 having a positive refractive power and movable along the optical axis for keeping an image plane, which would tend to vary upon movement of the second lens group L2 and movement of the position of a subject, in a constant position, and a fifth lens group L5 having a negative refractive power, which lens groups are arranged successively from the object side. The first lens group L1 includes a negative meniscus lens G1 which is convex toward the object side, a prism PP for bending the optical axis through 90 degrees, and a biconvex positive lens G2 having both surfaces as aspherical convex surfaces. The second lens group L2 includes a negative meniscus lens G3 which is convex toward the object side, and a cemented negative lens G4 made up of a biconcave negative lens and a biconvex positive lens. The third lens group L3 includes a biconvex positive lens G5 having both surfaces as aspherical convex surfaces. The fourth lens group L4 includes a cemented positive lens G6 made up of a biconvex positive lens having an aspherical surface toward the objective side and a negative meniscus lens having a convex surface toward the image side. The fifth lens group L5 includes a biconcave negative lens G7, a biconvex positive lens G8, and a cemented positive lens G9 made up of a biconvex positive lens and a biconcave negative lens. An aperture diaphragm SP, which is fixed along the optical axis when the magnification is varied, is disposed on the image side of the third lens group L3.

The negative lens G7 of the fifth lens group L5 serves as the sub lens group GF, the positive lens G8 as the sub lens group GS, and the cemented positive lens G9 as the sub lens group GR. The positive lens G8 (the sub lens group GS) can be shifted in a direction perpendicular to the optical axis for correcting image blurs.

In FIG. 22, IP represents a focusing plane, and G a cover glass.

Table 10 shows various specification values of a numerical example 4 which is based on specific numerical values as applied to the fourth embodiment.

TABLE 10 f = 6.00~16.80 Fno = 3.60~3.88 2ω = 65.47°~23.25°

| | | | | | | | |
|---|---|---|---|---|---|---|---|
| r1 = | 23.3237 | d1 = | 0.601 | n1 = | 1.92286 | v1 = | 20.9 |
| r2 = | 7.7897 | d2 = | 1.303 | | | | |
| r3 = | ∞ | d3 = | 7.200 | n3 = | 1.83500 | v3 = | 43.0 (  )1 |
| r4 = | ∞ | d4 = | 0.200 | | | | |
| r5 = | 12.8397 | d5 = | 1.999 | n5 = | 1.77250 | v5 = | 49.6 |
| r6 = | −14.7766 | d6 = | 0.500 | | | | |
| r7 = | 320.6840 | d7 = | 0.500 | n7 = | 1.88300 | v7 = | 40.8 |
| r8 = | 7.9002 | d8 = | 1.004 | | | | |
| r9 = | −6.9423 | d9 = | 0.502 | n9 = | 1.80420 | v9 = | 46.5 |
| r10 = | 14.8319 | d10 = | 1.003 | n10 = | 1.92286 | v10 = | 20.9 |
| r11 = | −46.9917 | d11 = | 5.298 | | | | |
| r12 = | 15.8302 | d12 = | 1.465 | n12 = | 1.77250 | v12 = | 49.6 |
| r13 = | −16.7834 | d13 = | 0.901 | | | | |
| r14 = | ∞ | d14 = | 1.000 | | | | ( )2 |
| r15 = | ∞ | d15 = | 4.642 | | | | |
| r16 = | 72.4538 | d16 = | 1.999 | n16 = | 1.69680 | v16 = | 55.5 |
| r17 = | −4.6045 | d17 = | 0.500 | n17 = | 1.88300 | v17 = | 40.8 |
| r18 = | −10.0445 | d18 = | 0.500 | | | | |
| r19 = | −13.6462 | d19 = | 0.500 | n19 = | 1.78590 | v19 = | 43.9 |
| r20 = | 15.9762 | d20 = | 1.398 | | | | |
| r21 = | 38.2521 | d21 = | 3.000 | n21 = | 1.48749 | v21 = | 70.4 |
| r22 = | −7.6963 | d22 = | 1.018 | | | | |
| r23 = | 12.0759 | d23 = | 3.017 | n23 = | 1.61800 | v23 = | 63.4 |
| r24 = | −6.9930 | d24 = | 0.721 | n24 = | 1.75248 | v24 = | 30.4 |
| r25 = | 39.5766 | d25 = | 7.884 | | | | |
| r26 = | ∞ | d26 = | 0.500 | n26 = | 1.51680 | v26 = | 64.2 |
| r27 = | ∞ | d27 = | 0.500 | | | | |
| r28 = | ∞ | d28 = | | | | | |

1: (prism)
2: (diaphragm)

As the lens positions change from the wide-angle end to the telephoto end, the surface-to-surface distance d6 between the first lens group L1 and the second lens group L2, the surface-to-surface distance d11 between the second lens group L2 and the third lens group L3, the surface-to-surface distance d15 between the aperture diaphragm SP and the fourth lens group L4, and the surface-to-surface distance d18 between the fourth lens group L4 and the fifth lens group L5 change. Table 11 shows values of the above surface-to-surface distances of the numerical example 4 at the wide-angle end, the intermediate focal length between the wide-angle end and the telephoto end, and the telephoto end, together with focal lengths f.

TABLE 11

| | f = 6.00 | f = 10.04 | f = 16.80 |
|---|---|---|---|
| d6 | 0.500 | 3.570 | 6.841 |
| d11 | 5.298 | 2.586 | 0.500 |
| d15 | 4.642 | 1.693 | 0.200 |
| d18 | 0.500 | 3.092 | 3.399 |

The 5th, 6th, 12th, 13th, and 16th lens surfaces include aspherical surfaces r5, r6, r12, r13, and r16, respectively. The aspherical coefficients of the above surfaces of the numerical example 4 are shown in Table 12.

TABLE 12

| | | | | | | | | |
|---|---|---|---|---|---|---|---|---|
| r5 | A = | −2.13761E−04 | B = | 1.48907E−05 | C = | −7.77055E−07 | D = | 1.57931E−08 |
| r6 | A = | −8.69683E−05 | B = | 1.64578E−05 | C = | −8.73949E−07 | D = | 1.81154E−08 |
| r12 | A = | 4.37899E−05 | B = | −2.19689E−05 | C = | 4.28752E−06 | D = | −1.18281E−07 |
| r13 | A = | 2.29095E−04 | B = | −1.08964E−05 | C = | 2.67647E−06 | D = | −3.60515E−08 |
| r16 | A = | 6.74802E−08 | B = | 1.10776E−05 | C = | −4.26015E−07 | D = | 3.16267E−08 |

Figure 23:
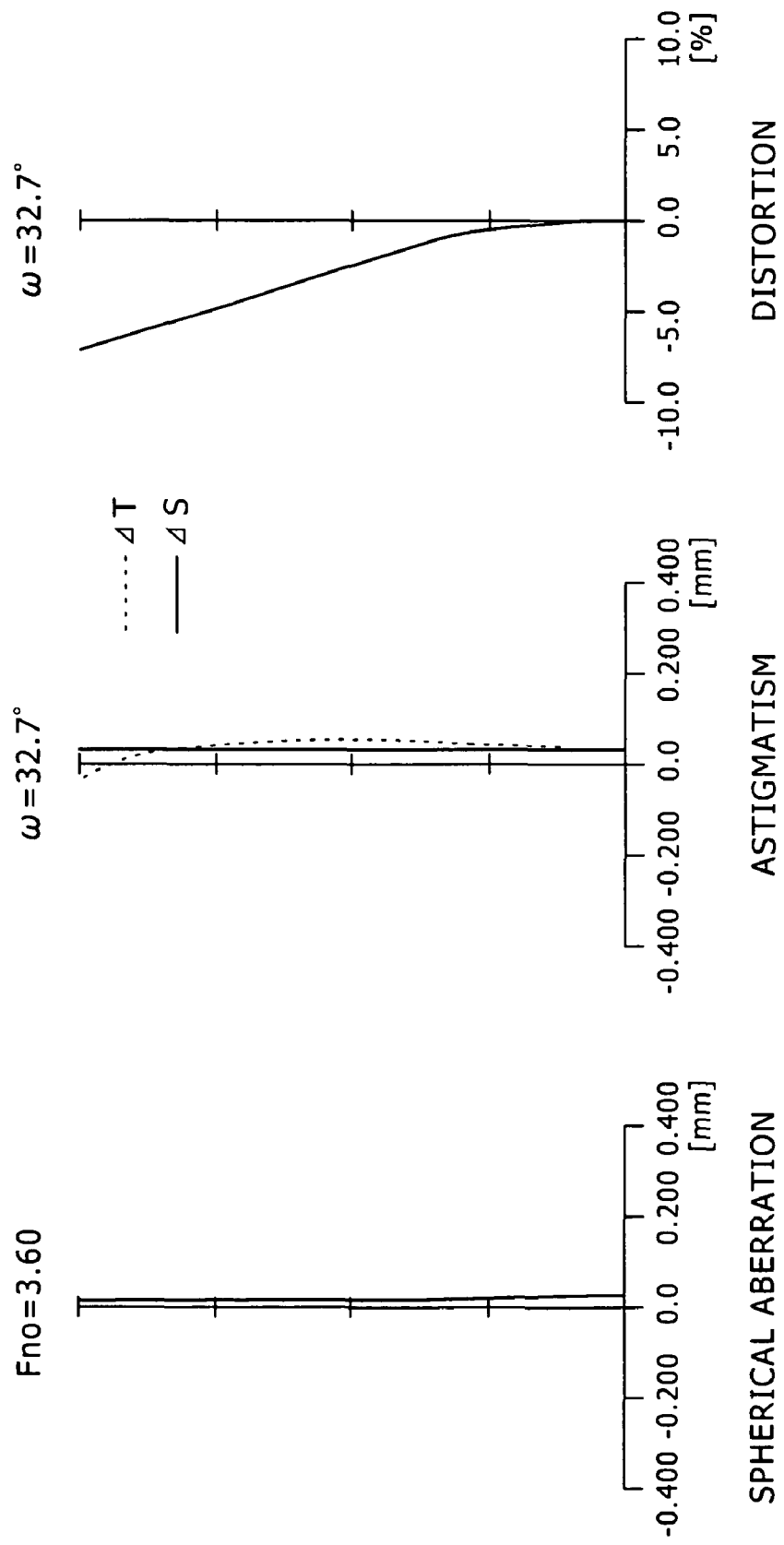
FIG. 23 is a diagram showing, together with FIGS. 24 through 28, various aberrations of a numerical example 4 which is provided when specific numerical values are applied to the zoom lens according to the fourth embodiment of the present invention, the view showing spherical aberration, astigmatism, and distortion at a wide-angle end.
Figure 24:
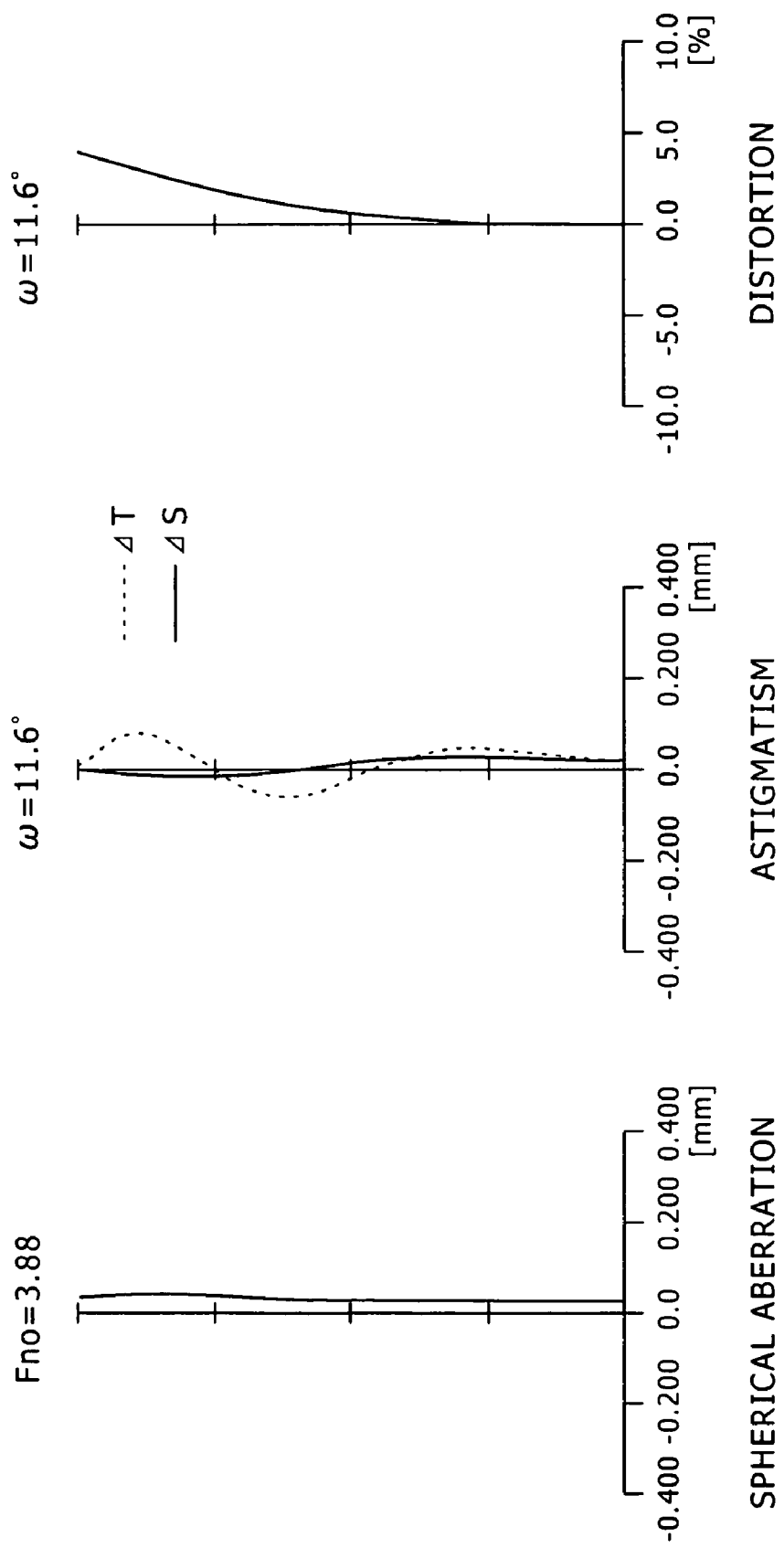
FIG. 24 is a diagram showing spherical aberration, astigmatism, and distortion at a telephoto end.

FIGS. 23 through 28 are diagrams showing aberrations of the numerical example 4. FIG. 23 shows spherical aberration, astigmatism, and distortion at the wide-angle end. FIG. 24 shows spherical aberration, astigmatism, and distortion at the telephoto end. In the astigmatism diagram, the solid-line curve represents a sagittal image plane, and the broken-line curve a tangential image plane. FIG. 25 shows lateral aberrations at the wide-angle end, FIG. 26 shows lateral aberrations at the telephoto end, FIG. 27 shows lateral aberrations when an image blur of 0.2 degree is corrected at the wide-angle end, and FIG. 28 shows lateral aberrations when an image blur of 0.2 degree is corrected at the telephoto end.

Table 13 shows blur correcting coefficients E, focusing sensitivities P, and shape factors S.F. of the numerical examples 1 through 4 at the telephoto end, lateral magnifications βS of the sub lens groups GS thereof, and lateral magnifications βR of the sub lens groups GR thereof.

TABLE 13

| | 数値実施例1 1 | 数値実施例2 2 | 数値実施例3 3 | 数値実施例4 4 |
|---|---|---|---|---|
| 5ブレ補正係数 E | 0.426 | 0.851 | 0.568 | 0.952 |
| 6ピント敏感度 P | 0.345 | 0.763 | 0.405 | 0.516 |
| S.F. | −1.946 | 0.388 | −0.590 | 0.665 |
| β S | 0.311 | 0.026 | 0.113 | −0.274 |
| β R | 0.618 | 0.874 | 0.641 | 0.747 |

1: Numerical example 1
2: Numerical example 2
3: Numerical example 3
4: Numerical example 4
5: Blur correcting coefficient E
6: Focusing sensitivity P
* The numerical values represent values at the telephoto end.

As can be seen from the above description, the tables, and diagrams illustrating the aberrations, the sub lens groups GS and the sub lens groups GR disposed adjacent to the sub lens groups GS on the image side and fixed for correcting image blurs in the numerical examples 1 through 4 satisfy the conditional expressions (1) through (5), and while the image blur correcting capability is maintained by shifting the sub lens groups GS in the direction perpendicular to the optical axis, defocusing due to the movement of the image plane upon positional deviation of the sub lens groups GS along the optical axis is reduced. Furthermore, since there is a sufficient distance from the lens of the final lens group which is closest to the image side to the image plane, it provides an advantage in placing an actuating mechanism for correcting image blurs.

Figure 29:
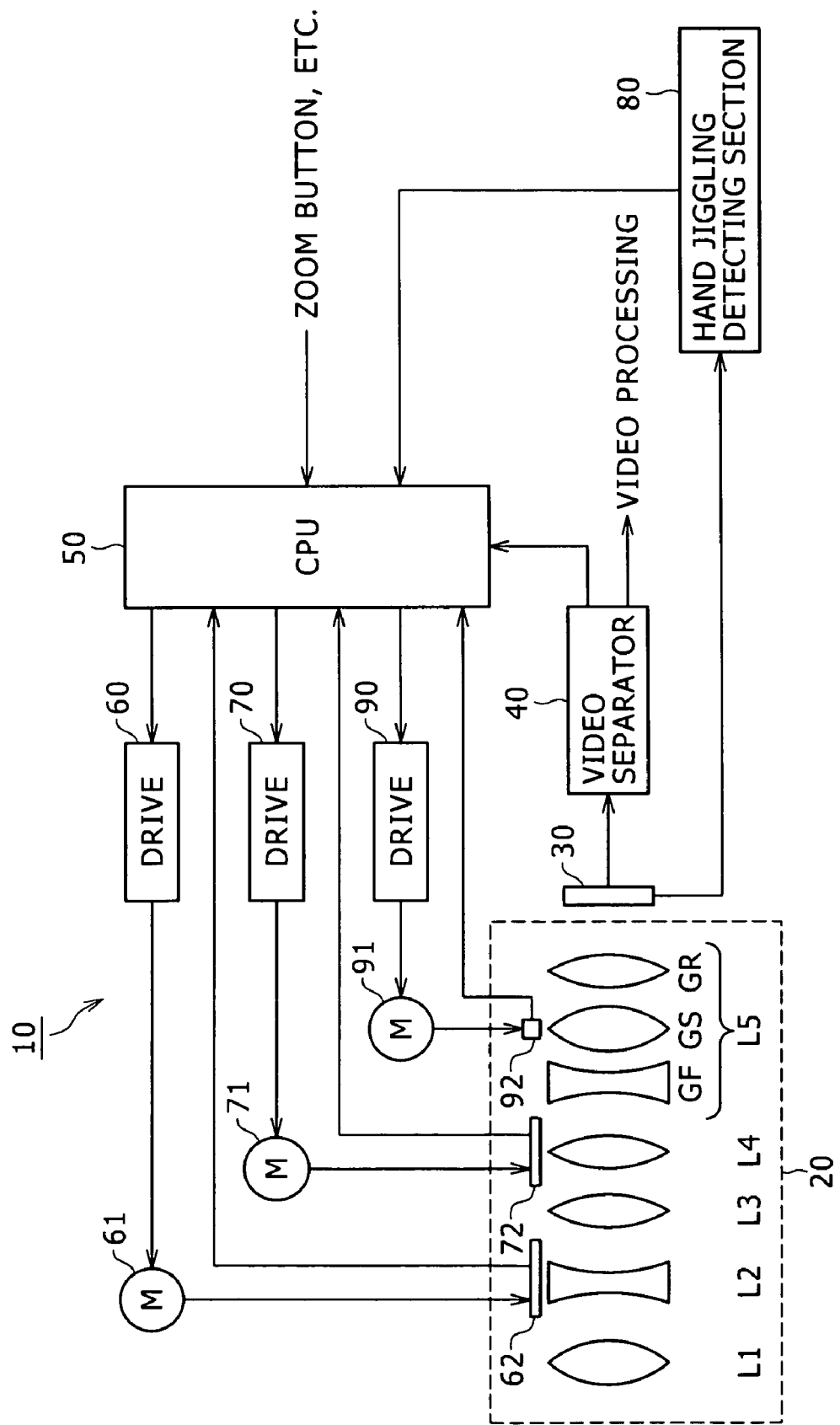
FIG. 29 is a block diagram of an image capturing device according to an embodiment of the present invention.

FIG. 29 shows an image capturing device according to an embodiment of the present invention.

The image capturing device 10 has a zoom lens 20 and an imaging element 30 for converting an optical image formed by the zoom lens 20 into an electric signal. The imaging element 30 may be a photoelectric conversion element such as a CCD (Charge Coupled Device), a CMOS (Complementary Metal-Oxide Semiconductor), or the like. The zoom lens 20 may include a zoom lens according to the present invention. In FIG. 29, the lens groups of the zoom lens according to the first embodiment shown in FIG. 1 are simply shown as respective single lenses. However, not only the zoom lens 1 according to the first embodiment, but also any of the zoom lenses 2 through 4 according to the second through fourth embodiments, and other zoom lenses according to the present invention than the embodiments described in the present specification may be used.

The electric signal generated by the imaging element 30 is separated by a video separating circuit 40 into a focus control signal that is sent to a control circuit 50 and a video signal that is sent to a video processing circuit. The signal that is sent to the video processing circuit is processed into formats suitable for subsequent processing, and will be processed in various ways, e.g., displayed on a display device, recorded in a recording medium, and transferred by a communicating section.

The control circuit 50 is supplied with an external control signal such as a zoom button signal, for example, and performs any of various processing operations depending on the supplied external control signal. For example, when the control circuit 50 is supplied with a zooming control signal from a zoom button, the control circuit 50 controls driver circuits 60, 70 to operate actuators 61, 71, respectively, to move the lens groups L2, L4 to respective positions for achieving a focal length based on the zooming control signal. The positional information of the lens groups L2, L4 is detected by sensors 62, 72 and sent to the control circuit 50, which refers to the positional information in outputting command signals to the driver circuits 60, 70. The control circuit 50 checks a focused state based on the signal sent from the video separating circuit 40, and positionally controls the fourth lens group L4 through the driver circuit 70 and the actuator 71 to achieve an optimally focused state.

The image capturing device 10 has a hand jiggling correcting function. For example, when the imaging element 30 is jiggled by the depression of a shutter release button and the jiggle is detected by a hand jiggling detecting section 80 such as a gyrosensor, for example, a signal from the hand jiggling detecting section 80 is applied to the control circuit 50, which calculates a jiggle correcting angle to compensate for an image blur caused by the jiggle. To bring the sub lens group GS of the fifth lens group L5 into a position based on the calculated jiggle correcting angle, the control circuit 50 controls a hand jiggling control section (driver circuit) 90 to operate an actuator 91 for shifting the sub lens group GS in a direction perpendicular to the optical axis. The position of the sub lens group GS of the fifth lens group L3 is detected by a sensor 92. The positional information of the sub lens group GS is input from the sensor 92 to the control circuit 50, which refers the positional information in sending a command signal to the hand jiggling control section (driver circuit) 90.

The image capturing device 10 may be in the form of any of various specific products. For example, the image capturing device 10 is applicable to a wide range of products including a digital still camera, a digital video camera, a camera unit of a digital input/output device such as a cellular phone combined with a camera, a PDA (Personal Digital Assistant) combined with a camera, or the like.

The specific shapes and numerical values of various parts which are indicated in the above embodiments and the numerical examples are given by way of specific example only in carrying out the invention, and should not be interpreted as limiting the technical scope of the present invention.

INDUSTRIAL APPLICABILITY

According to the present invention, there is provided a small-size zoom lens which is required to meet stringent manufacturing tolerances and assembling positional accuracies, the zoom lens being sufficient practical for use in a camera with an imaging element having one million pixels or more and having a vibration insulation function capable of correcting image blurs due to hand jiggling when capturing images.

The invention claimed is:

1. A zoom lens comprising a plurality of lens groups with distances between the lens groups being changed for variable power, wherein:
a final lens group which is positioned most closely to an image side has a sub lens group GS having a positive refractive power and a sub lens group GR disposed adjacent to the sub lens group GS on the image side and having a positive refractive power;
said sub lens group GS is shiftable in a direction perpendicular to the optical axis for correcting image blurs; and
said sub lens group GS has a lateral magnification $\beta s$ and said sub lens group GR has a lateral magnification $\beta R$, the lateral magnifications satisfying the following conditional expressions (1), (2):

$$\beta s < 1 \tag{1}$$

$$0 < \beta R < 1. \tag{2}$$

2. The zoom lens according to claim 1, wherein said final lens group has a sub lens group GF disposed adjacent to said sub lens group GS on an object side and having a negative refractive power.

3. The zoom lens according to claim 1, wherein the lateral magnifications satisfy the following conditional expressions (3), (4):

$$-0.5 < \beta s < 0.5 \tag{3}$$

$$0.5 < \beta R < 1. \tag{4}$$

4. The zoom lens according to claim 1, wherein the lens surface of said sub lens group GS which is closest to the object side has a radius RS1 of curvature and the lens surface thereof which is closest to the image side has a radius RS2 of curvature, the radii of curvature satisfying the following conditional expression (5):

$$-3.0 < (RS1+RS2)/(RS1-RS2) < 1.5. \tag{5}$$

5. The zoom lens according to claim 1, wherein the first lens group which is positioned most closely to the image side has a reflecting member for bending the optical axial through about 90 degrees.

6. The zoom lens according to claim 1, wherein a lens group which is positioned more closely to the image side than an aperture diaphragm is moved along the optical to make a focusing action.

7. The zoom lens according to claim 1, wherein the lens groups include a first lens group having a positive refractive power, a second lens group having a negative refractive power and movable along the optical axis for variable power, a third lens group having a positive refractive power, a fourth lens group having a positive refractive power and movable along the optical axis for keeping an image plane, which would tend to vary upon movement of the second lens group and movement of the position of a subject, in a constant position, and a fifth lens group having a positive or negative refractive power as said final lens group, which lens groups are arranged successively from the object side.

8. An image capturing device comprising a zoom lens and an imaging element for converting an optical image formed by said zoom lens into an electric signal,
wherein said zoom lens includes a plurality of lens groups with distances between the lens groups being changed for variable power, a final lens group which is positioned most closely to an image side has a sub lens group GS having a positive refractive power and a sub lens group GR disposed adjacent to the sub lens group GS on the image side and having a positive refractive power, said sub lens group GS is shiftable in a direction perpendicular to the optical axis for correcting image blurs, and said sub lens group GS has a lateral magnification $\beta s$ and said sub lens group GR has a lateral magnification $\beta R$, the lateral magnifications satisfying the following conditional expressions (1), (2):

$$\beta s < 1 \tag{1}$$

$$0 < \beta R < 1. \tag{2}$$

9. An image capturing device according to claim 8, comprising:
hand jiggling detecting means for detecting a jiggle of the imaging element;
hand jiggling control means for calculating a jiggle correcting angle to compensate for an image blur caused by the jiggle of the imaging element as detected by said hand jiggling detecting means, and sending a drive signal to an actuator for bringing said sub lens group GS into a position based on the jiggle correcting angle; and
a hand jiggling actuator for shifting said sub lens group in a direction perpendicular to the optical axis based on said drive signal.

* * * * *